(12) United States Patent
Ritter et al.

(10) Patent No.: US 12,028,690 B2
(45) Date of Patent: Jul. 2, 2024

(54) CONCEPT FOR MODIFYING A LOUDSPEAKER SIGNAL FOR PREVENTING DIAPHRAGM OVER-DEFLECTION

(71) Applicant: Fraunhofer-Gesellschaft zur Förderung der angewandten Forschung e.V., Munich (DE)

(72) Inventors: Robin Ritter, Ilmenau (DE); Georg Fischer, Ilmenau (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 288 days.

(21) Appl. No.: 17/660,372

(22) Filed: Apr. 22, 2022

(65) Prior Publication Data

US 2022/0248137 A1 Aug. 4, 2022

Related U.S. Application Data

(63) Continuation of application No. PCT/EP2020/079813, filed on Oct. 22, 2020.

(30) Foreign Application Priority Data

Oct. 25, 2019 (DE) .......................... 102019216504.4

(51) Int. Cl.
*H04R 3/00* (2006.01)
*G06N 5/04* (2023.01)
*H04R 29/00* (2006.01)

(52) U.S. Cl.
CPC ............... *H04R 3/007* (2013.01); *G06N 5/04* (2013.01); *H04R 29/001* (2013.01)

(58) Field of Classification Search
CPC ...... H04R 29/001; H04R 3/007; H04R 3/002; H03G 11/00; H03G 11/002; H03G 11/04; H03G 11/08; H03G 2210/106
See application file for complete search history.

(56) References Cited

U.S. PATENT DOCUMENTS

| 4,113,983 A | 9/1978 | Steel |
| 4,327,250 A | 4/1982 | Von Recklinghausen |
| (Continued) | | |

FOREIGN PATENT DOCUMENTS

| EP | 2827330 A1 | 1/2015 |
| EP | 3089364 A1 | 11/2016 |
| (Continued) | | |

OTHER PUBLICATIONS

DIN 45631, Berechnung des Lautstärkepegels aus dem Geräuschspektrum, Oct. 1967.
(Continued)

*Primary Examiner* — Kile O Blair
(74) *Attorney, Agent, or Firm* — Perkins Coie LLP; Michael A. Glenn

(57) ABSTRACT

A concept for modifying a loudspeaker signal to prevent diaphragm over-deflection, in which a diaphragm deflection signal is predicted block by block, in overlapping time blocks, on the basis of the loudspeaker signal, so as to obtain one diaphragm deflection signal block per time block, is made more efficient. In accordance with an embodiment, a temporal evaluation position is determined at which then an attenuation factor is calculated from the current diaphragm deflection signal block, with the application of which a modified current diaphragm deflection signal block is obtained, and then a modified loudspeaker signal is synthesized on the basis of the modified current diaphragm deflection signal block.

18 Claims, 9 Drawing Sheets

(56) References Cited

U.S. PATENT DOCUMENTS

| | | | |
|---|---|---|---|
| 5,481,617 | A | 1/1996 | Bjerre |
| 5,528,695 | A | 6/1996 | Klippel |
| 5,577,126 | A | 11/1996 | Klippel |
| 7,372,966 | B2 | 5/2008 | Bright |
| 8,855,322 | B2 | 10/2014 | Ryu et al. |
| 9,807,502 | B1 | 10/2017 | Hatab et al. |
| 2013/0077795 | A1 | 3/2013 | Risbo et al. |
| 2013/0144615 | A1 | 6/2013 | Rauhala et al. |
| 2018/0014121 | A1 | 1/2018 | Lawrence et al. |
| 2018/0184201 | A1 | 6/2018 | Lawrence et al. |
| 2021/0120336 | A1 | 4/2021 | Ritter et al. |

FOREIGN PATENT DOCUMENTS

| | | |
|---|---|---|
| EP | 3110169 A1 | 12/2016 |
| WO | 0103466 A2 | 1/2001 |
| WO | 2018101868 A1 | 6/2018 |

OTHER PUBLICATIONS

DIN EN ISO 3745, Akustik-Bestimmung der Schallleistungspegel von Geräuschquellen aus Schalldruckmessungen. Verfahren der Genauigkeitsklasse 1 für reflexionsarme Räume und Halbräume, May 2003.

DIN EN ISO 61672-1, Electroakustik-Schallpegelmesser-Teil 1, Anforderungen. Jul. 2014.

Behler, Gottfried, et al., "Loudspeaker protection system for mobile devices", Proceedings of the 22nd International Congress on Acoustics. Buenos Aires, Argentinien, Sep. 2016.

Beranek, Leo L., et al., "Acoustics—Sound Fields and Transducers", Ed. New York, USA: Elsevier Inc., 2012. ISBN 9780123914217, pp. 247-249.

Borwick, John, "Loudspeaker and Headphone Handbook", 3rd Ed. Oxford, England, Reed Educational and Professional Publishing Ltd, 2001. ISBN 0 240 51578 1.

Cooley, W., et al., "An algorithm for the machine calculation of complex Fourier series", Mathematics of Computation 19, 1965, pp. 297-301.

Enders, Roland, "Das Homerecording Handbuch", Ed. Munich, Germany, GC Gunther Carstens, 1997. ISBN 3-910098-13-4, pp. 128-129 and pp. 254-255.

Girardin, Guillaume, "Acoustic MEMS and Audio Solutions", Yole Development, Villeurbanne, France, Apr. 2017.

Hofmann, S., "Numerische Integration von Beschleunigungssignalen", Institut für Maschinenwesen-Institutsmitteilung 38, 2013, pp. 103-114.

Klippel, Wolfgang, "Diagnosis and Remedy of Nonlinearities in Electrodynamical Transducers", Proceedings of the 109th Audio Engineering Society Convention, Los Angeles, USA, Sep. 2000.

Klippel, Wolfgang, "Loudspeaker Nonlinearities—Causes, Parameters, Symptoms", Journal of the Audio Engineering Society 54, 2006, pp. 907-939.

Klippel, Wolfgang, "Mechanical Overload Protection of Loudspeaker Systems", Journal of the Audio Engineering Society 64, 2016, pp. 771-783.

Klippel, Wolfgang, "Prediction of Speaker Performance at High Amplitudes", Proceedings of the 111th Audio Engineering Society Convention. New York, USA, Nov. 2001.

Kratsas, Rob, "Unleashing the Audio Potential of Smartphones", Cirrus Logic, Dec. 2010.

Lou, Chenchi, et al., "A Model based Excursion Protection Algorithm for Loudspeakers", IEEE International Conference on Acoustics, Speech and Signal Processing (ICASSP), Kyoto, Japan, Aug. 2012.

Möser, Michael, "Technische Akustik", 8th Ed. Berlin, Germany, Springer, 2009, ISBN 978-3-540-89817-7, pp. 156-159 and 366-367.

Müller, Swen, "Digitale Signalverarbeitung für Lautsprecher", Technische Hochschule Aachen, Diss., Jan. 1999—with English abstract.

Powersoft, "How to setup limiters", Scandicci, Italy. Powersoft, 2013.

Robjohns, Hugh, "Sound on Sound", https://www.soundonsound.com/forum/viewtopic.php?f=16&t=55170, download May 15, 2018—with printout.

Seidel, Ulf, et al., "Fast and Accurate Measurement of the Linear Transducer Parameters", Proceedings of the 110th Audio Engineering Society Convention. Amsterdam, Netherlands, May 2001.

Smith, Steven W., "The Scientist and Engineer's Guide to Digital Signal Processing", Ed. Oxford, England, Newnes, 2011. ISBN 9780750674447.

Smith, III, Julius O., "Spectral Audio Signal Processing", 1st Ed. Stanford, USA, W3K Publishing, 2011. ISBN 978-0974560731—Index attached. Whole document available at https://ccrma.stanford.edu/~jos/sasp/.

Zollner, Manfred, et al., "Elektroakustik", 3rd Ed. Berlin, Germany, Springer, 2003. ISBN 978-3-540-56600-7, p. 153.

Zölzer, Udo, "Digital Audio Signal Processing", 2nd Ed. New York, USA, John Wiley and Sons Ltd, 2008. ISBN 978-0470997857.

CONCEPT FOR MODIFYING A LOUDSPEAKER SIGNAL FOR PREVENTING DIAPHRAGM OVER-DEFLECTION

CROSS-REFERENCES TO RELATED APPLICATIONS

This application is a continuation of copending International Application No. PCT/EP2020/079813, filed Oct. 22, 2020, which is incorporated herein by reference in its entirety, and additionally claims priority from German Application No. DE 102019216504.4, filed Oct. 25, 2019, which is incorporated herein by reference in its entirety.

Embodiments according to the invention relate to an apparatus and a method for modifying a loudspeaker signal for preventing diaphragm over-deflection. In other words, this can be a deflection limiter, for example.

BACKGROUND OF THE INVENTION

U.S. Pat. Nos. 4,113,983A, 4,327,250A and 5,481,617A: in these inventions, high-pass filters having a variable cutoff frequency filtering out the low-frequency portions from the input signal on the basis of a deflection model are described. The input signal passes through a high-pass filter whose cutoff frequency is initially very low (e.g., 20 Hz). Subsequently, the signal is split and reaches, on the one hand, the amplifier and further the loudspeaker. On the other hand, the same reaches a model for predicting the diaphragm deflection via a feedback loop. Then, a controller checks whether the amplitude of the predicted signal is above the determined limiting value. If this is the case, the cutoff frequency of the high-pass filter is corrected upwards. A disadvantage of the filter design is that frequency portions that are insignificant for diaphragm deflection may be extracted from the signal. This effects unnecessary deterioration of the sound quality. A further difficulty is the reaction time of the individual blocks. Since no delay element exists, a certain safety zone to the actual maximum deflection limit has to be kept since the signal typically needs at least one feedback pass before the protection mechanism becomes active. Thus, impulse-like signal portions are difficult to correct. This additional safety zone reduces the maximum sound pressure level of the system.

US2018001412A1: the input signal is split and reaches, on the one hand, a delay element, whereupon a filterbank decomposes the same into individual frequency bands. Individual attenuation factors are added to these frequency bands. On the other hand, the incoming signal is converted into a deflection signal per model, which is subsequently decomposed into individual frequency bands with individual attenuation factors like in the first signal path. The attenuation factors of both paths are identical. An over-deflection detector checks whether the deflection signal exceeds the determined limiting value. If this is the case, the gain calculator is activated, which calculates new attenuation factors for reducing the deflection. The gain update block responsible for updating the attenuation factors in the voltage signal path operates while taking into accountattack, hold and release times. For calculating the attenuation factors, a normalized least mean squares (NLMS) optimization is used.

A MODEL BASED DEFLECTION PROTECTION ALGORITHM FOR LOUDSPEAKERS, Chenchi (Eric) Luo, James McClellan, Milind Borkar, Arthur Redfern: at the beginning, the deflection is predicted for the n+1-th sample, on the basis of the n-th voltage sample as well as a non-linear loudspeaker model. If the diaphragm deflection is too high, this deflection sample is corrected by the compressor and is subsequently calculated back to a voltage sample with the help of an inverse loudspeaker module. With this method, excessive diaphragm deflections are to be localized more easily and hence corrected more specifically. The compressor offers the option for different compression ratios as well as the option for soft knee/hard knee to improve the control of the intensity of the effect.

U.S. Pat. No. 8,855,322B2 shows a multiband limiter (frequency bands oriented at frequency groups of hearing) with a psychoacoustic model for loudness maximization and linear deflection model (transmission function).

U.S. Pat. No. 9,807,502BA shows a loudspeaker controller including deflection limiter, temperature limiter and power reduction with psychoacoustic model.

Basic problem: loudspeakers (independent of the actuator principle) may be damaged or destroyed due to excessive mechanical load. Generally, this takes place when applying a high input voltage resulting in excessive deflection of the mechanical components of the sound transducer (diaphragm, suspension, . . . ).

General approach: the diaphragm deflection is limited by controlled reduction of the input voltage at the loudspeaker.

Problems of a simple solution: simple limiters result in poor sound quality and cannot guarantee the mechanical protection of the transducer, or need too much headroom, which does not fully utilize the performance of the transducer.

Regarding this, there is a need for a concept allowing an improved tradeoff between improvement of the sound quality, high performance of the transducer and good mechanical protection of the transducer.

SUMMARY

An embodiment may have an apparatus for modifying a loudspeaker signal for preventing diaphragm over-deflection, configured to predict a diaphragm deflection signal, block-by-block, in overlapping time blocks, on the basis of the loudspeaker signal to obtain one diaphragm deflection signal block per time block; determine, for the current time block, by subjecting a current diaphragm deflection signal block or the loudspeaker signal in the current time block to an inference by an attenuation inference machine learning model, an attenuation factor for preventing diaphragm over-deflection while taking into account mutual diaphragm deflection signal block overlap; attenuate the current diaphragm deflection signal block with the attenuation factor to obtain a modified current diaphragm deflection signal block; and synthesize a modified loudspeaker signal on the basis of the modified current diaphragm deflection signal block.

Another embodiment may have an apparatus for modifying a loudspeaker signal to prevent diaphragm over-deflection, configured to predict, block by block, in overlapping time blocks, a diaphragm deflection signal on the basis of the loudspeaker signal to obtain one diaphragm deflection signal block per time block; determine a temporal position within an overlap area of a current time block with a subsequent time block by subjecting a current diaphragm deflection signal block or the loudspeaker signal in the current time block to an inference by an evaluation temporal position inference machine learning model; calculate, for the current time block, an attenuation factor for the current diaphragm deflection signal block while taking into account a comparison of the current diaphragm deflection signal block with a subsequent diaphragm deflection signal block or an estimate of the subsequent diaphragm deflection signal block from the current diaphragm deflection signal block at the temporal position; attenuate the current diaphragm deflection signal block with the attenuation factor to obtain a modified current diaphragm deflection signal block; and synthesize a modified loudspeaker signal on the basis of the modified current diaphragm deflection signal block.

According to yet another embodiment, a method of modifying a loudspeaker signal to prevent diaphragm over-deflection may have the steps of: predicting, block by block, in overlapping time blocks, on the basis of the loudspeaker signal, a diaphragm deflection signal in order to obtain, per time block, a diaphragm deflection signal block; determining, for the current time block, an attenuation factor for preventing diaphragm over-deflection while taking into account mutual diaphragm deflection signal block overlap by subjecting a current diaphragm deflection signal block or the loudspeaker signal in the current time block to an inference by an attenuation inference machine learning model; attenuating the current diaphragm deflection signal block with the attenuation factor to obtain a modified current diaphragm deflection signal block; and synthesizing a modified loudspeaker signal on the basis of the modified current diaphragm deflection signal block.

According to still another embodiment, a method of modifying a loudspeaker signal to prevent diaphragm over-deflection may have the steps of: predicting, block by block, in overlapping time blocks, on the basis of the loudspeaker signal, a diaphragm deflection signal to obtain one diaphragm deflection signal block per time block; determining a temporal position within an overlap area of a current time block with a subsequent time block by subjecting a current diaphragm deflection signal block or the loudspeaker signal in the current time block to an inference by an evaluation temporal position inference machine learning model; for the current time block, calculating an attenuation factor for the current diaphragm deflection signal block while taking into account a comparison of the current diaphragm deflection signal block with a subsequent diaphragm deflection signal block or an estimation of the subsequent diaphragm deflection signal block from the current diaphragm deflection signal block at the temporal position; attenuating the current diaphragm deflection signal block with the attenuation factor to obtain a modified current diaphragm deflection signal block; and synthesizing a modified loudspeaker signal on the basis of the modified current diaphragm deflection signal block.

According to another embodiment, a non-transitory digital storage medium may have a computer program stored thereon to perform the inventive methods, when said computer program is run by a computer.

The embodiments presented here relate to a concept for modifying a loudspeaker signal to prevent diaphragm over-deflection. A diaphragm deflection signal is predicted block-by-block, in overlapping time blocks, on the basis of the loudspeaker signal, so as to obtain one diaphragm deflection signal block per time block. Thus, e.g., before the loudspeaker signal is transmitted to a loudspeaker, the apparatus can infer diaphragm deflection caused, e.g., by the loudspeaker signal at a diaphragm of the loudspeaker, from the loudspeaker signal. In accordance with an embodiment, a temporal evaluation position is determined at which then, while taking into account a comparison of the current diaphragm deflection signal block with a subsequent diaphragm deflection signal block or an estimation of the subsequent diaphragm deflection signal block, an attenuation factor is calculated from the current diaphragm deflection signal block at the temporal position; with the application of said attenuation factor, a modified current diaphragm deflection signal block is obtained, and then a modified loudspeaker signal is synthesized on the basis of the modified current diaphragm deflection signal block. The evaluation timing is determined by subjecting the current diaphragm deflection signal block or the loudspeaker signal in the current time block to an inference by an evaluation temporal position inference machine learning model, the model having been trained accordingly such that subsequently, the attenuation determined there will be optimal, e.g. optimal in the sense of as good and as loud a reproduction as possible, in terms of human hearing, of the audio signal that corresponds to the synthesized loudspeaker signal, while preventing diaphragm over-deflection.

According to an alternative embodiment, by subjecting the current diaphragm deflection signal block or the loudspeaker signal in the current time block to an inference by a machine learning model, the attenuation factor is determined directly. This attenuation inference machine learning model is trained, for example, such that the determined attenuation will be optimal, e.g. optimal in the sense of as good and as loud a reproduction as possible, in terms of human hearing, of the audio signal that corresponds to the synthesized loudspeaker signal, while preventing diaphragm over-deflection.

The embodiments just presented simplify a comparison example according to which firstly, a temporal position of a maximum deflection of a current diaphragm deflection signal block of a current time block within an overlap area with a subsequent time block is determined, in order to then calculate, for the current time block, while taking into account a comparison of the current diaphragm deflection signal block with a subsequent diaphragm deflection signal block or an estimation of the subsequent diaphragm deflection signal block, from the current diaphragm deflection signal block at this temporal position, a level up to which the current diaphragm deflection signal block can be modulated (or controlled) without diaphragm over-deflection, and to attenuate the current diaphragm deflection signal block on the basis of said level. Also, in the embodiments of the present invention, the diaphragm deflection signal of the current time block is attenuated neither insufficiently, nor in excess, while taking into account the overlap with the subsequent diaphragm deflection signal block, whereby high sound quality may be achieved. By attenuating overlapping diaphragm deflection signal blocks in this manner, they result in a diaphragm deflection signal through an overlap-add (e.g., a segmented convolution of modified diaphragm deflection signal blocks of successive time blocks) that should have a deflection amplitude less than the diaphragm over-deflection, so that mechanical protection should be ensured. The level up to which the diaphragm deflection signal block may be controlled so as to attenuate the current diaphragm deflection signal block in an optimized ratio as compared to the subsequent diaphragm deflection signal block need not necessarily be explicitly determined in an elaborate manner. The level may be determined at the temporal position determined by the ML (machine learning) model, e.g. such that the current diaphragm deflection signal block is attenuated such that the current diaphragm deflection signal block is attenuated such that a maximum diaphragm deflection amplitude can be obtained at this temporal position, e.g., after the overlap-add. Thus, the modified current diaphragm deflection signal block can be obtained, which can ensure that the loudspeaker signal synthesized therefrom, e.g., the diaphragm of the loudspeaker to which the synthesized loudspeaker signal can be transmitted, cannot be damaged by diaphragm over-deflection and the loudspeaker can be operated at high performance, e.g., by using the complete possible deflection of the diaphragm (e.g., up to the maximum diaphragm deflection amplitude) without diaphragm over-deflection.

Therefore, it has to be stated that the apparatus can provide high sound quality with good mechanical protection and high performance due to the synthesized loudspeaker signal.

According to an embodiment, for calculating the level, one may envisage determining a quotient between the current diaphragm deflection signal block at the temporal position on the one hand and a sum of the subsequent diaphragm deflection signal block or the estimation of the subsequent diaphragm deflection signal block at the temporal position and the current diaphragm deflection signal block at the temporal position on the other hand.

According to an embodiment, one may envisage processing the current diaphragm deflection signal block in a manner in which it is decomposed into frequency band signal time blocks. In this manner, it is possible to perform attenuation in a manner in which it is adapted to the human hearing threshold so as to achieve higher loudness while preventing diaphragm over-deflection and maintaining the audible sound quality.

BRIEF DESCRIPTION OF THE DRAWINGS

Embodiments according to the present invention will be discussed below in more detail with reference to the accompanying drawings. Regarding the illustrated schematic figures, it should be noted that the illustrated functional blocks are to be considered both as elements or features of the inventive apparatus as well as respective method steps of the inventive method and respective method steps of the inventive method can be derived therefrom. They show.

DETAILED DESCRIPTION OF THE INVENTION

Embodiments according to the present invention will be discussed in more detail below with reference to the accompanying drawings. Regarding the illustrated schematic figures, it should be noted that the illustrated functional blocks can be considered both as elements or features of the inventive apparatus and as respective method steps of the inventive method and respective method steps of the inventive method can also be derived therefrom. Before embodiments of the present invention will be discussed in more detail below with reference to the drawings, it should be noted that identical, functionally equal or equal elements, objects and/or structures in the different figures are provided with the same or similar reference numbers in the different figures such that the description of these elements illustrated in different embodiments is inter-exchangeable or inter-applicable.

The description starts with the representation of a comparative example.

Figure 1:
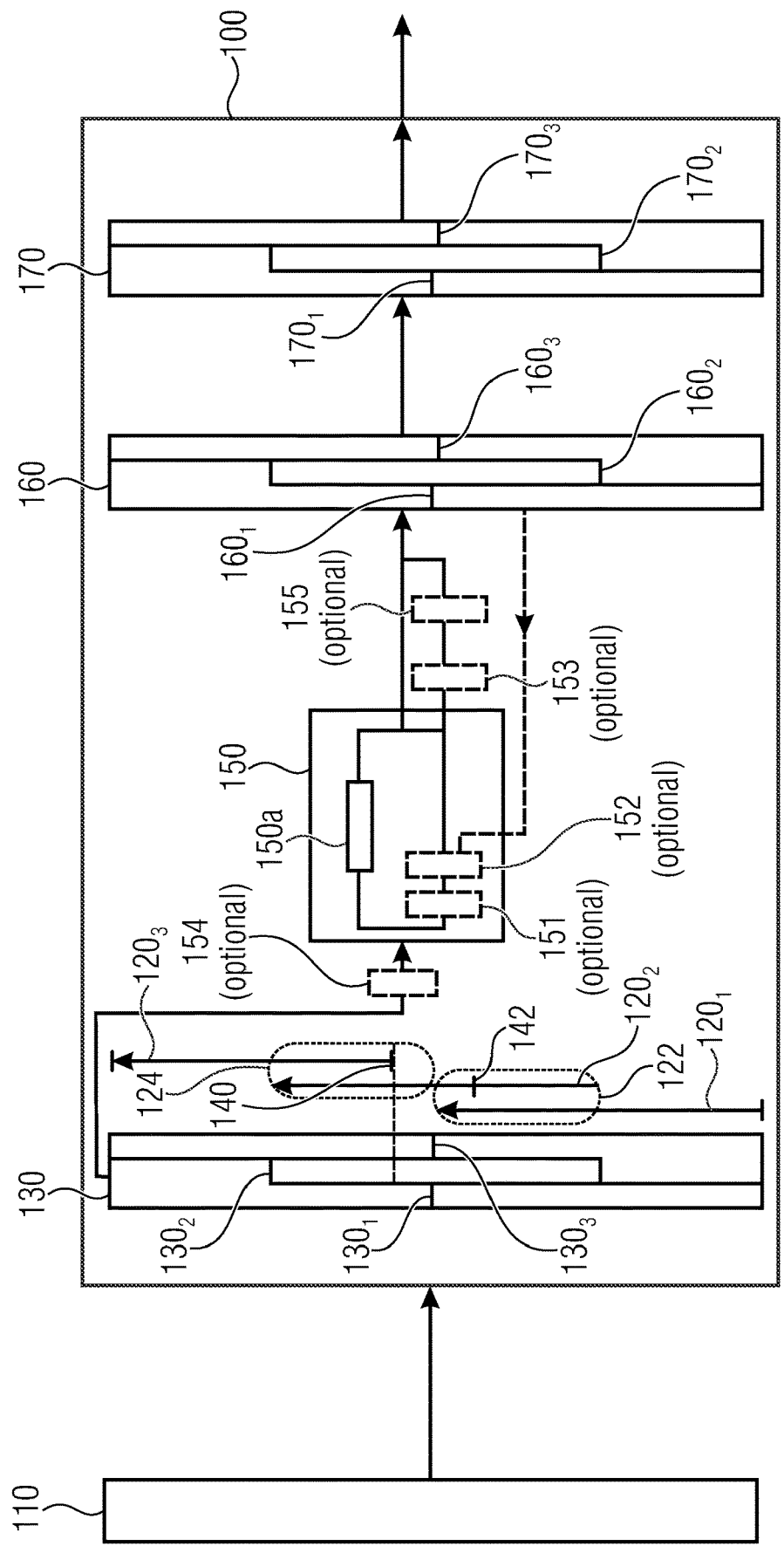
FIG. 1 a schematic representation of an apparatus according to a comparative example.

FIG. 1 shows a schematic illustration of an apparatus 100 for modifying a loudspeaker signal 110 for preventing diaphragm over-deflection. The apparatus 100 can be configured to predict a diaphragm deflection signal 130 block-by-block in overlapping time blocks $120_1$ to $120_3$ based on the loudspeaker signal 110 to obtain one diaphragm deflection signal block $130_1$ to $130_3$ per time block $120_1$ to $120_3$. According to FIG. 1, for example, the apparatus 100 can obtain three diaphragm deflection signal blocks $130_1$ to $130_3$ for three time blocks $120_1$ to $120_3$. It is possible that the apparatus 100 can predict the diaphragm deflection signal 130 with more overlapping time blocks $120_1$ to $120_3$ from the loudspeaker signal 110. In that way, for example, the apparatus 100 can predetermine that the time blocks $120_1$ to $120_3$ have a block size of 10 ms (block sizes of ≥5 ms, ≥8 ms oder≥10 ms are advantageous), whereby the apparatus 100 can obtain so many diaphragm deflection signal blocks $130_1$ to $130_3$ that the complete loudspeaker signal 110 (for example the complete time period of the loudspeaker signal 110) can be completely reflected by the time blocks $120_1$ to $120_3$ with a block length predetermined by the apparatus 100. In that way, for example, the diaphragm deflection signal 130 can define how much the loudspeaker signal 110 would deflect a diaphragm at a loudspeaker at any time.

The apparatus 100 is configured to determine a temporal position 140 of a maximum deflection of a current diaphragm deflection signal block $130_2$ of a current time block $120_2$ within an overlap area 124 with a subsequent time block $120_3$. In that way, the apparatus 100 can, for example, sample the current diaphragm deflection signal block $130_2$ for a maximum deflection within the overlap area 124 of the current time block $120_2$. This maximum deflection can result, for example, in diaphragm over-deflection when the apparatus 100 does not modify the diaphragm deflection signal 130.

The apparatus 100 is also configured to calculate (for example with the processing means 150), for the current time block $120_2$ while taking into account a comparison of the current diaphragm deflection signal block $130_2$ with a subsequent diaphragm deflection signal block $130_3$ or an estimation of the subsequent diaphragm deflection signal block $130_3$ from the current diaphragm deflection signal block $132_2$ at the temporal position, a level 150a up to which the current diaphragm deflection signal block $130_2$ can be modulated without diaphragm over-deflection. By the level 150a, the apparatus 100 can determine how much the current diaphragm deflection signal block $130_2$ should, for example, be attenuated to attenuate the current diaphragm deflection signal block $130_2$ in a ratio matching the subsequent diaphragm deflection signal block $130_3$, such that high sound quality can be maintained by the apparatus 100.

Further, the apparatus 100 is configured to attenuate the current diaphragm deflection signal block $130_2$ based on the level 150a to obtain a modified current diaphragm deflection signal block $160_2$. The apparatus can perform this, for example, for each diaphragm deflection signal block $130_1$ to $130_3$ to obtain, for example, three modified diaphragm deflection signal blocks $160_1$ to $160_3$ according to FIG. 1. The modified diaphragm deflection signal blocks $160_1$ to $160_3$ can define a modified diaphragm deflection signal 160.

Further, the apparatus 100 is configured to synthesize a modified loudspeaker signal 170 based on the modified current diaphragm deflection signal block $160_2$. For this, the apparatus 100 can, for example, synthesize a modified loudspeaker signal block $170_1$, $170_2$ from each modified diaphragm deflection signal block $160_1$, $160_2$ and join them to the modified loudspeaker signal 170 by an overlap-add method. Alternatively, the apparatus 100 can be configured to first join the modified diaphragm deflection signal blocks $160_1$, $160_2$ to the modified diaphragm deflection signal 160 by the overlap-add method and to synthesize the complete modified loudspeaker signal 170 in one step from the modified diaphragm deflection signal 160. Optionally, the apparatus 100 can provide the loudspeaker signal 170 modified in that manner and transmit the same, for example, to a loudspeaker.

For calculating the level 150a, a quotient between the current diaphragm deflection signal block $130_2$ at the temporal position 140, on the one hand, and a sum of the subsequent diaphragm deflection signal block $130_3$ or the estimation of the subsequent diaphragm deflection signal block $130_3$ at the temporal position 140 and the current diaphragm deflection signal block $130_2$ at the temporal position 140, on the other hand, can be determined. This step can be performed, for example, with the processing means 150. The quotient can define, for example, the relationship of the current diaphragm deflection signal block $130_2$ to the subsequent diaphragm deflection signal block $130_3$ at the temporal position 140. Accordingly, the level 150a calculated in that manner can define how much the current diaphragm deflection signal block $103_2$ is to be attenuated at least so that a high sound quality can be maintained while preventing diaphragm over-deflection.

The quotient may be scaled by a safety factor, thereby causing, for example, a stronger attenuation of the diaphragm deflection signal 130, whereby mechanical protection of a diaphragm of a loudspeaker against diaphragm over-deflection may be increased. This step may be performed, for example, with the processing apparatus 150.

The current diaphragm deflection signal block $130_2$ may be decomposed into at least one frequency band signal time block. This may be effected, for example, by the processing apparatus 150. In that way, the apparatus 100 can decompose the current diaphragm deflection signal block $130_2$ into at least one frequency band, wherein the at least one frequency band signal time block can represent a frequency band of the current diaphragm deflection signal block $130_2$ for the complete current time block $120_2$. Thus, the apparatus 100 can decompose the current diaphragm deflection signal block $130_2$ into several frequency band signal time blocks, which can each represent the complete current time block $120_2$ and a differing frequency band of the current diaphragm deflection signal block $130_2$.

This feature enables the apparatus 100 to attenuate or modify the current diaphragm deflection signal block $130_2$ such that no or only few nonlinearities result in the modified current diaphragm deflection signal block $160_2$. Thereby, the apparatus 100 can ensure high sound quality. The feature described herein can represent, for example, a frequency band decomposition 151 by the processing means 150.

The apparatus 100 can be configured to determine at least one further temporal position 142 for each of the at least one frequency band signal time block, where a predetermined signal combination (e.g., of the current diaphragm deflection signal block $130_2$ with the preceding modified diaphragm deflection signal block $160_1$) exceeds a maximum deflection limiting value in the first overlap area 122 of the current time block $120_2$ with the preceding time block $120_1$ as well as in the residual time block $120_2$ (e.g., also in the overlap area 124). The predetermined signal combination can represent, for example, an overlap-add of the current diaphragm deflection signal block $130_2$ with the modified preceding diaphragm deflection signal block $160_1$ in the first overlap area 122. The maximum deflection limiting value can define, for example, from when on, e.g., an amplitude of the current diaphragm deflection signal block $130_2$ would result in diaphragm over-deflection when the apparatus 100 would not attenuate or modify the current diaphragm deflection signal block $130_2$. Thus, at least one further temporal position 142, which can also be referred to as critical temporal position, can be determined per frequency band signal time block, whereby the apparatus 100 can determine how the at least one frequency band signal time block should be modified or attenuated so that diaphragm over-deflection can be prevented, and hence good mechanical protection for loudspeakers can be ensured by the apparatus 100. This can take place, for example, by means of position determination 152 of the processing means 150.

The signal combination can include an additive combination of the current diaphragm deflection signal block $130_2$ with a modified preceding diaphragm deflection signal block $160_1$ and an additive combination of the respective frequency band signal time block with the modified preceding diaphragm deflection signal block $160_1$, and an additive combination of an amount of the current diaphragm deflection signal block $130_2$ with an amount of the modified preceding diaphragm deflection signal block $160_1$. Thus, e.g., at least one of the three additive combinations should exceed the maximum deflection limiting value at the further temporal position 142. The three additive combinations are based on the finding that deflection peaks (for example, maximum deflections) of a frequency band signal block cancel each other out in a superposition due to a phase position and can be invisible in the current diaphragm deflection signal block $130_2$. Further, with the three additive combinations, it can be considered that deflection peaks in high-frequency frequency band signal time blocks should be attenuated to a sufficient extent and deflection peaks in the current diaphragm deflection signal block $130_2$ may be smeared by close extremes in the individual frequency band signal time blocks. Thus, at least one further temporal position 142 where diaphragm over-deflection can occur and should hence be modified by the apparatus 100 can be determined with the apparatus 100 by the three additive combinations of the signal combination.

The apparatus 100 is configured to determine an attenuation factor for each of the at least one frequency band signal time block based on the level 150a and the further temporal position 142 to attenuate the current diaphragm deflection signal block $130_2$. This can take place by attenuation factor determination 153. Thus, for example, the attenuation factor determination 153 can obtain the at least one further temporal position 142 per frequency band signal time block from the position determination 152 and can obtain the level 150a from the processing means 150. This can enable that, when optimizing the attenuation factors, usage of arbitrary start values can be prevented and instead deflection values can be used at the further temporal position 142, which can accelerate optimization. Thus, the apparatus 100 is configured to modify or attenuate the diaphragm deflection signal 130 very efficiently, e.g., while ensuring high sound quality, such that diaphragm over-deflection caused by the loudspeaker signal 110 can be prevented.

The attenuation factor is compared by the apparatus 100, for example per frequency band signal time block for the current time block 120₂, to a version of the attenuation factor per frequency band signal time block for the previous time block 120₁, reduced in attenuation strength by a predetermined fading-away function, and a selected attenuation factor among same, which may be associated with a higher attenuation, is used for the current time block 120₂. Thus, it can, for example, be considered that an attenuation of the preceding diaphragm deflection signal block 130₁ can comprise a fading-away function that can also influence an attenuation of the current diaphragm deflection signal block 130₂ by the apparatus 100, whereby, for example, the current diaphragm deflection signal block 130₂, for example, reduced in attenuation strength with the attenuation factors by the predetermined fading-away function, can already be sufficiently attenuated to prevent diaphragm over-deflection. Thus, with this feature, the attenuation factors can be selected such that the current diaphragm deflection signal block 130₂ is sufficiently attenuated by the apparatus 100 to prevent diaphragm over-deflection and hence to provide good mechanical protection for a loudspeaker by the apparatus 100. This can take place with the attenuation factor determination 153.

The apparatus 100 can be configured to split the current diaphragm deflection signal block 130₂ into a percussive signal portion and a harmonic signal portion, and to determine the predetermined fading-away function in dependence on the percussive signal portion and/or the harmonic signal portion. This can take place, for example, with diaphragm deflection signal splitting 154 prior to the frequency band decomposition 151. This feature can improve the sound quality, since, for example, shorter time constants of the predetermined fading-away function are better suited for percussive signals and longer time constants, e.g., for harmonic signals. The split into the percussive signal portion and the harmonic signal portion can take place, for example, for the complete current diaphragm deflection signal block 130₂ or for each frequency band signal time block of the current diaphragm deflection signal block 130₂.

The apparatus 100 is eventually configured to calculate a modified current loudspeaker signal block 170₂ from the modified current diaphragm deflection signal block 160₂ and to subject the modified current loudspeaker signal block 170₂ to an overlap-add with the modified preceding loudspeaker signal block 170₁ to synthesize a modified loudspeaker signal 170. When calculating the current loudspeaker signal block 170₂, for example, no subsequent modified loudspeaker signal block 170₃ exists. Thus, an output to a loudspeaker can be, for example, the overlap of the preceding modified loudspeaker signal block 170₁ with a first part of the current modified loudspeaker signal block 170₂, wherein the first part can be, for example, an overlap area 122 of the current time block 120₂ with the preceding time block 120₁.

Alternatively, the apparatus 100 can be configured to provide a current loudspeaker signal 110 instead of the modified current loudspeaker signal block 170₂ when a maximum deflection of the current diaphragm deflection signal block 130₂ of the current time block 120₂ does not exceed a maximum deflection limiting value. Thus, the apparatus 100 can very efficiently protect a loudspeaker from diaphragm over-deflection by attenuating or modifying the current loudspeaker signal 110 only when the apparatus 100 detects that diaphragm over-deflection can be caused at the loudspeaker by the current loudspeaker signal 110.

To attenuate the current diaphragm deflection signal block 130₂, one or more attenuation factors may be calculated on the basis of the level 150a (e.g., while using the attenuation factor determination 153), and the one or more attenuation factors may be offset against the current diaphragm deflection signal block 130₂. With a computing means 155, the one or several attenuation factors can be computed with the current diaphragm deflection signal block 130₂ such that a modified current diaphragm deflection signal block 160₂ can be determined, which should not result in diaphragm over-deflection.

Figure 3:
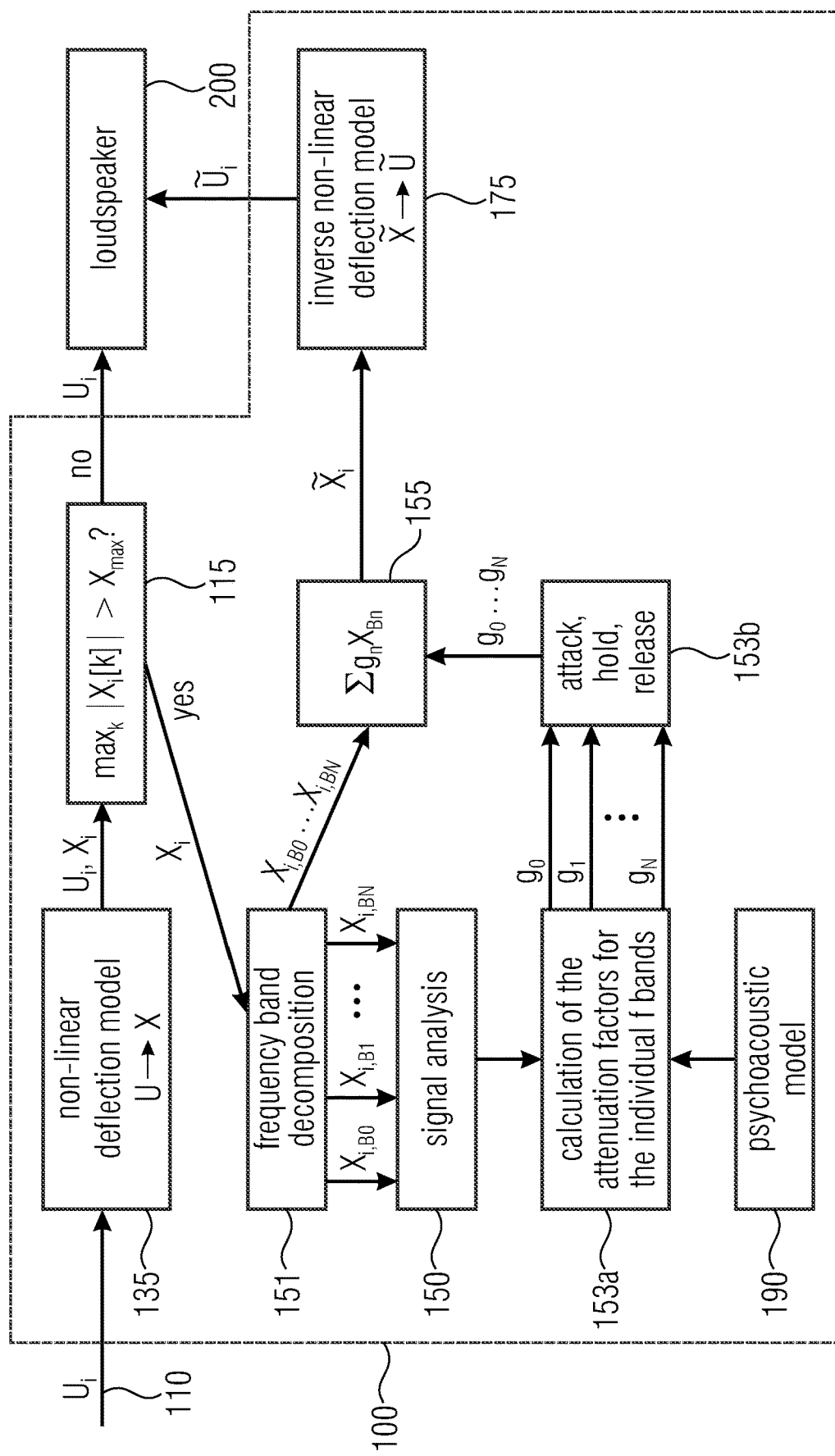
FIG. 3 a block diagram of a overall signal flow according to an implementation of the apparatus of FIG. 1.

FIG. 3 shows an implementation example of the apparatus 100, in other words, e.g., an overall signal flow in a deflection limiter (e.g., the apparatus 100).

In the following, the apparatus 100 can also be referred to as deflection limiter. According to an embodiment, the apparatus 100 can be configured to modify a loudspeaker signal U, 110 to prevent diaphragm over-deflection, e.g., $X > X_{max}$, to predict 135 a diaphragm deflection signal X block-by-block in overlapping time blocks based on the loudspeaker signal U, 110 to obtain one diaphragm deflection signal block $X_i$ per time block. Here, e.g., the complete loudspeaker signal U, 110 can be detected by the apparatus 100 or block-by-block in overlapping time blocks. In that way, a current loudspeaker signal of a current time block can be referred to, for example, as $U_i$ and $X_i$ can be a current diaphragm deflection signal block of a same time block. Here, i can be a positive integer. The diaphragm deflection signal X can have the same features and functionalities as the diaphragm deflection signal 130 of FIG. 1, and the current diaphragm deflection signal block $X_i$ can have the same features and functionalities as the diaphragm deflection signal block 130₂ of FIG. 1. Predicting 135 the diaphragm deflection signal X can take place, for example by means of a non-linear deflection model.

The apparatus 100 can be configured to determine a temporal position $k_0$ of a maximum deflection $X_i[k_0]$ of a current diaphragm deflection signal block $X_i$ of a current time block i within an overlap area with a subsequent time block i+1. This takes place, e.g., in the signal analysis 150.

The apparatus 100 can be configured to calculate a level (e.g., $h_i X_{max}$), up to which the current diaphragm deflection signal block $X_i$ can be modulated without diaphragm over-deflection, for the current time block i while taking into account a comparison of the current diaphragm deflection signal block (e.g., $X_i[k_0]$) with a subsequent diaphragm deflection signal block (e.g., $X_{i+1}[k_0 - M_{step}]$) or an estimation of the subsequent diaphragm deflection signal block (e.g., $X_{i+1}[k_0 - M_{step}]$), from the current diaphragm deflection signal block $X_i$ at the temporal position (e.g., $k_0$ in the current time block i and $k_0 - M_{step}$ in the subsequent time block i+1, wherein $k_0$ and $k_0 - M_{step}$ represent the corresponding point in time for the respective diaphragm deflection signal block in the overlap area of the two time blocks). This can take place in the signal analysis 150.

Further, the apparatus 100 can be configured to attenuate the current diaphragm deflection signal block $X_i$ based on the level ($h_i X_{max}$) to obtain a modified current diaphragm deflection signal block $\overline{X}_i$. This can take place with the computing unit 155.

Further, the apparatus 100 can be configured to synthesize 175 a modified loudspeaker signal $\tilde{U}$ based on the modified current diaphragm deflection signal block $\tilde{X}_i$. Here, for example, the complete modified loudspeaker signal $\tilde{U}$ can be synthesized 175 based on a completely modified diaphragm deflection signal $\tilde{U}$ or block-by-block in overlapping time blocks, such that a current modified loudspeaker signal $\tilde{U}_i$ is synthesized 175, for example, based on the current modified diaphragm deflection signal block $\tilde{X}_i$ of a same time block. Here, i can be a positive integer and can comprise the complete modified diaphragm deflection signal $\tilde{X}$ of the current diaphragm deflection signal block $\tilde{X}_i$. The modified diaphragm deflection signal $\tilde{X}$ can have the same features and functionalities as the modified diaphragm deflection signal 160 of FIG. 1, the current modified diaphragm deflection signal block $\tilde{X}_i$, can have the same features and functionalities as the current modified diaphragm deflection signal block $160_2$ of FIG. 1, the modified loudspeaker signal $\tilde{U}$ can have the same features and functionalities as the modified loudspeaker signal 170 of FIG. 1, and the current modified loudspeaker signal $\tilde{U}_i$ can have the same features and functionalities as the current modified loudspeaker signal $170_2$ of FIG. 1. Synthesizing 175 the modified loudspeaker signal $\tilde{U}$ can take place, e.g., by means of an inverse nonlinear deflection model. Optionally, the apparatus 100 can transmit the modified loudspeaker signal $\tilde{U}$ or the current modified loudspeaker signal $\tilde{U}_i$ to a loudspeaker 200.

Optionally, the apparatus 100 can be configured to a current loudspeaker signal $U_i$ provide instead of the modified current loudspeaker signal block $\tilde{U}_i$ and to transmit the same, e.g., to the loudspeaker 200 when a maximum deflection of the current diaphragm deflection signal block $X_i$ of the current time block i does not exceed a maximum deflection limiting value $X_{max}$ [e. g. $\max_k |X_i[k]| < X_{max}$], which the apparatus 100 can perform by a query 115.

Further, the apparatus 100 can be configured to decompose the current diaphragm deflection signal block ($X_i$) into at least one frequency band signal time block ($X_{i,B0}$ to $X_{i,BN}$, with N frequency band signal time blocks, wherein N is a positive integer) with a frequency band decomposition 151.

The apparatus can be configured to determine, for each of the at least one frequency band signal time blocks $X_{i,B0}$ to $X_{i,BN}$, at least one further temporal position ($k_{c,l}$) where a predetermined signal combination exceeds a maximum deflection limiting value $X_{max}$ in the first overlap area of the current time block i with the preceding time block i−1 as well as in the reciprocal time block i. This takes place, e.g., by means of the signal analysis 150.

One may envisage determining an attenuation factor $g_0$ to $g_N$ for each of the at least one frequency band signal time block $X_{i,B0}$ to $X_{i,BN}$, based on the level $h_l X_{max}$ and the further temporal position ($k_{c,l}$) to attenuate the current diaphragm deflection signal block $X_i$. This takes place, e.g., by means of the attenuation factor determination 153a.

The apparatus 100 can be configured, in particular, to compare an attenuation factor $g_0$ to $g_N$ per frequency band signal time block $X_{i,B0}$ to $X_{i,BN}$ for the current time block i with a version of the attenuation factor $g_0$ to $g_N$ per frequency band signal time block $X_{i,B0}$ to $X_{i,BN}$ for the preceding time block i−1, reduced in attenuation strength by a predetermined fading-away function, and to use a selected attenuation factor $g_0$ to $g_N$ that is associated with a higher attenuation for the current time block of the same. This takes place, e.g., via the attack, hold and release functions 153b. If it applies according to an embodiment that a current $g_N$ is smaller than an old $g_N$, the attack, hold and release functions 153b should select the current $g_N$, otherwise the release function should still be followed, wherein, for example, a higher attenuation factor $g_N$ can cause less attenuation. According to an embodiment, an attenuation factor g=1 can define an attenuation of 0 dB and an attenuation factor g=0.1 can define an attenuation of 20 dB.

Optionally, the attenuation factor determination 153a can use a psychoacoustic model 190 to optimize determination of the attenuation factors $g_0$ to $g_N$ and to thereby improve the sound quality of the modified loudspeaker signal $\tilde{U}$ or the current loudspeaker signal block $\tilde{U}_i$.

Thereby, the intelligent signal analysis system 150 illustrated in FIG. 3 can represent both an overall deflection (e.g., of the current diaphragm deflection signal block ($X_i$) as well as the deflection in the respective frequency bands (e.g., in the individual frequency band signal time blocks $X_{i,B0}$ to $X_{i,BN}$), which can provide for the fact that the deflection limiting value $X_{max}$ can be approximated without unnecessary headroom. Headroom means an unused portion of a maximum deflection of a diaphragm of the loudspeaker 200. Thus, when a headroom exists, the diaphragm is hardly or never completely deflected. If the headroom is too large, no high performance can be obtained at the loudspeaker. The apparatus causes, e.g., only a very small or no headroom, whereby a very high performance of the loudspeaker 200 can be obtained. Further, FIG. 3 can represent a system that can combine the best partial approaches to an optimum overall system and can comprise a separate attack, hold and release regulation 153b for percussive and harmonic signal portions, which result in an improvement of the sound quality.

Preprocessing

In other words, FIG. 3 shows a deflection limiter 100 to which an input voltage U (e.g., the loudspeaker signal U, 110) is supplied, for example, block by block (e.g., in time blocks i). The time blocks i can have a common temporal block size that defines, e.g., the length of a time block i. Block sizes≥10 ms have proven to be particularly good. Block sizes of ≥50 μs, ≥1 ms, ≥5 ms, ≥12 ms, ≥15 ms, ≥20 ms oder≥50 ms are also possible. A voltage curve in the i-th block can be referred to as $U_i$. The voltage curve in the i-th block can be an example for the current loudspeaker signal block $U_i$ in the current time block i.

For increasing a velocity of subsequent processing steps, low-pass filtering and undersampling may be performed, as high frequencies are hardly relevant for diaphragm deflection.

The voltage $U_i$ is used, e.g., as input signal of a non-linear deflection model for prediction 135 of the deflection $X_i$ (the current diaphragm deflection signal block $X_i$). The deflection model allows control without feedback path. Possible embodiments of the deflection models are a simple filter, a physical structural model (e.g., implemented in the state space) or a machine-learning model (e.g., neural network). The deflection model is not limited to a specific actuator principle—models for electrodynamic loudspeakers, piezoelectric loudspeakers, and electrostatic loudspeakers can be used in a modular manner. Additionally, the deflection model can be implemented in an adaptive i.e. time-variable manner to adapt the parameters continuously to the loudspeaker in an optimum way. In this case, the apparatus can comprise a feedback path. All listings of the deflection models and actuator principles stated herein are to be considered as exemplary and not limiting.

If the predicted deflection (e.g., an amplitude of the current diaphragm deflection signal block $X_i$) does not exceed the limiting value $X_{max}$, the input signal is passed on directly to the loudspeaker. Otherwise, the predicted deflection signal is, e.g., processed further and decomposed into N≥1 adjacent frequency bands (e.g., the frequency band signal blocks $X_{i,B0}$ to $X_{i,BN}$). This corresponds, for example, to the mode of operation of a filterbank. Possible implementations are, for example, adjacent band pass filters or also perfect reconstruction filterbanks like MDCT (modified discrete cosine transformation) or PQMF (pseudo quadrature mirror filters). It should be considered that this filterbank (e.g., the frequency band decomposition 151) and the psychoacoustic model 190 should consider the same frequency bands. All listings of the methods for decomposing the predicted deflection signal $X_i$ into adjacent frequency bands (B0 to BN, wherein N is, for example, a natural number between 1 and 100) stated herein are to be considered as exemplary and not limiting.

Signal Analysis and Calculation of the Attenuation Factors

First, e.g., a signal analysis 150 is performed by using all time signals of the individual frequency bands $X_{i,Bn}$ (wherein N is a natural number between 0 and N) as well as the overall deflection signals $\tilde{X}_{i-1}$, $X_i$ and possibly $\tilde{X}_{i+1}$ (wherein $\tilde{X}_{i-1}$ defines, e.g., a modified overall deflection signal of the time block i−1 preceding the current time block i). A block diagram for a possible embodiment is illustrated in FIG. 4.

Figure 4:
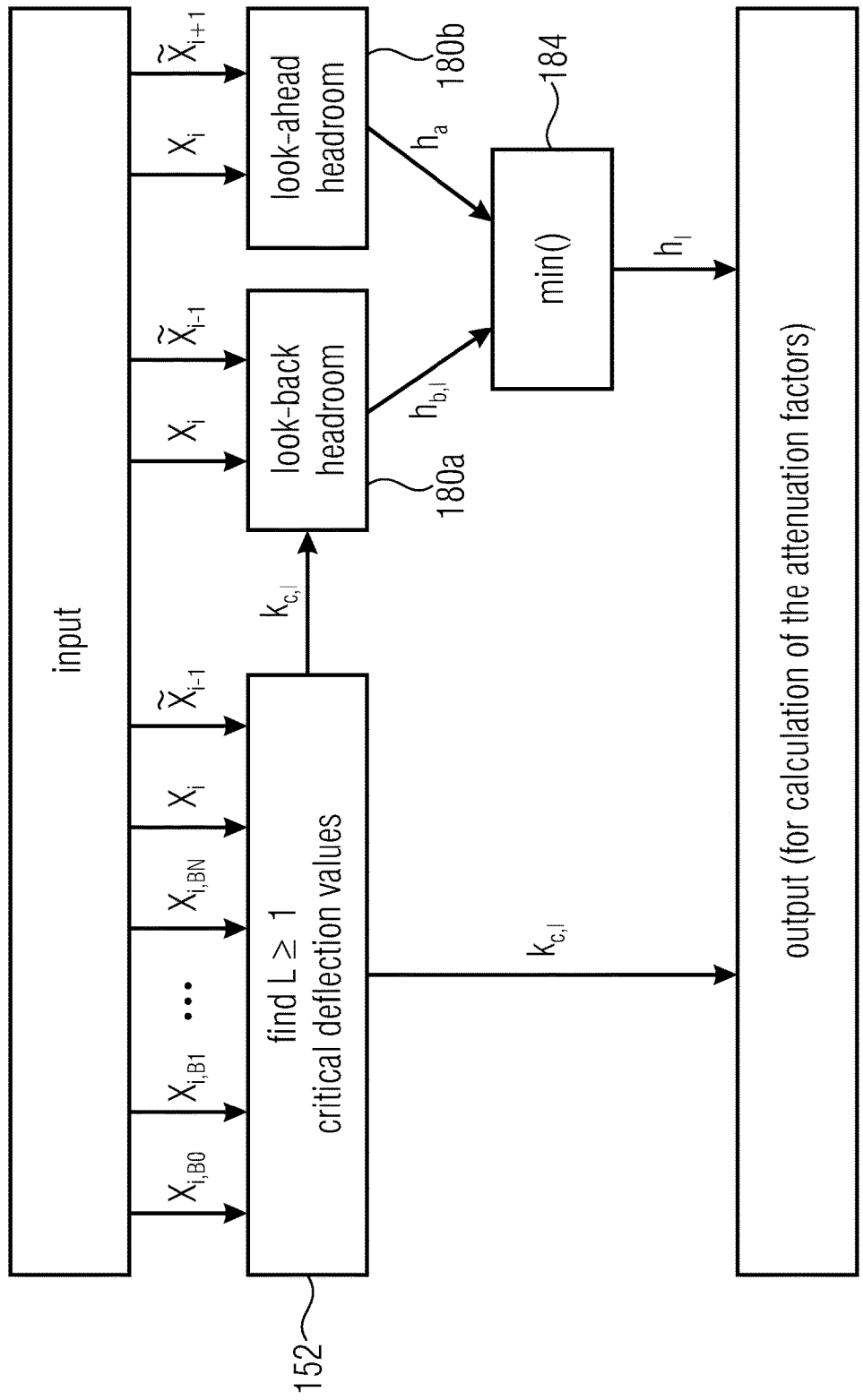
FIG. 4 a block diagram of a signal analysis of FIG. 3.

FIG. 4 shows a block diagram illustrating a signal flow, e.g., of the apparatus in the signal analysis that can comprise the same features and functionalities as the processing means 150 of FIG. 1 and as the signal analysis 150 of FIG. 3.

Figure 5C:
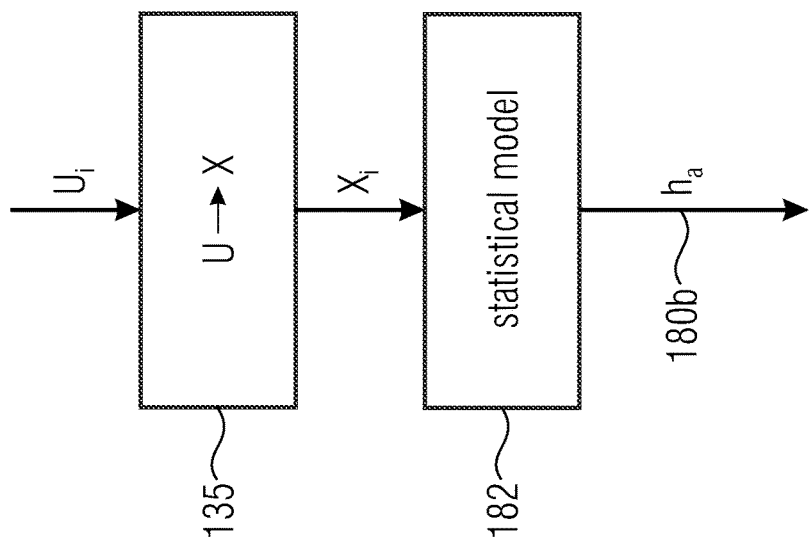
FIG. 5a-c block diagrams of calculating a second maximum deflection portion, specifically, in FIG. 5a, while using the subsequent diaphragm deflection signal block, in FIG. 5b while using an estimation of the subsequent diaphragm deflection signal block, and in FIG. 5c while using an estimation of the second maximum deflection portion.
Figure 5B:
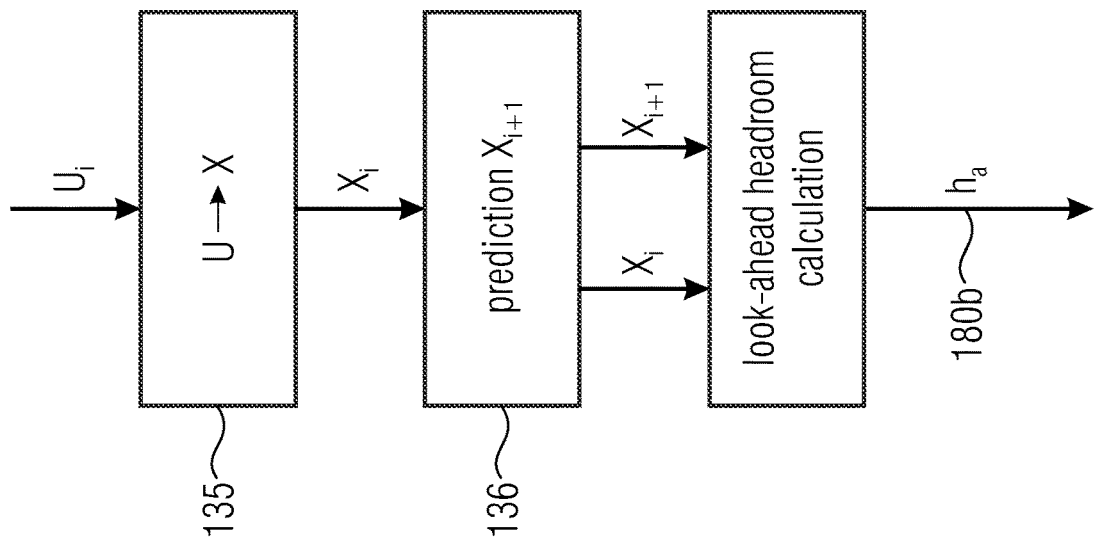
Figure 5A:
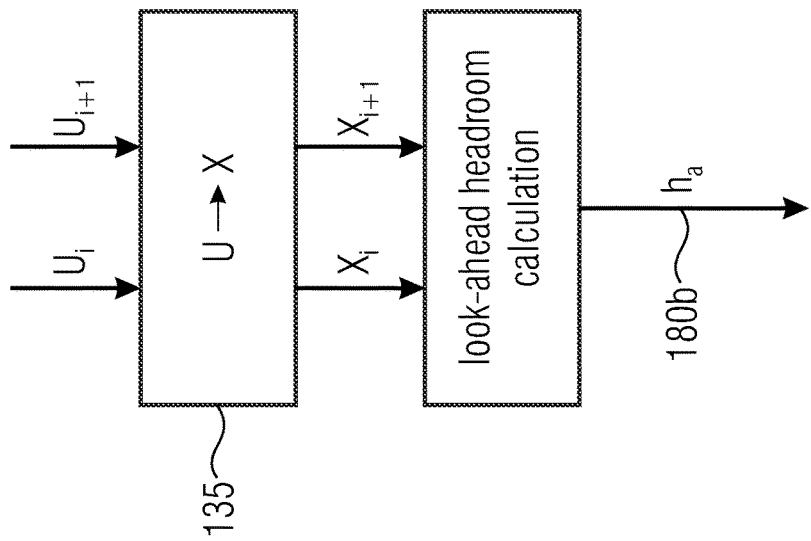

First, e.g., based on an overlap-add processing, it is considered how much the overall current block i should at least be attenuated so that $X_{max}$ is not exceeded in the overlap area with the subsequent block i+1. Here, it should be noted that the subsequent block i+1 is not attenuated too much. The latter measure is not needed to guarantee the protection of the transducer but to maximize the sound quality. Therefore, the look-ahead headroom $h_a$ (e.g., the second maximum deflection portion 180*b*, $h_a$) is calculated, e.g., by $$k_o = \mathrm{argmax}|X_i[M_{step} \ldots M_{block}]|$$

$$h_a = \frac{X_i[k_o]}{X_i[k_o] + X_{i+1}[k_o - M_{step}]} s \bigg| s \in [0; 1]$$

wherein $X_i$ can represent the time signal of the overall deflection in the i-th signal block (e.g., the current diaphragm deflection signal block), $M_{block}$ the block length and $M_{step}$ the step width of the overlap-add signal processing and s a parametric safety factor. In the following, the second maximum deflection portion 180*b*, $h_a$ can also be referred to as look-ahead headroom. By the look-ahead, e.g., the signal delay increases by $M_{step}$ samples. A respective prediction model for the future deflection curve (e.g., the subsequent diaphragm deflection signal block $X_{i+1}$) based on the current signal curve (e.g., the current diaphragm deflection signal block $X_{i+1}$), e.g., by means of a neural network or a statistic model for direct prediction of $h_a$ based on the current signal block (e.g., the current diaphragm deflection signal block $X_i$), could eliminate the consideration of the second signal block (e.g., the subsequent diaphragm deflection signal block $X_{i+1}$). FIG. 5*a*, FIG. 5*b* and FIG. 5*c* illustrate possible embodiments of the look-ahead headroom calculation 180*b*.

FIG. 5*a*, FIG. 5*b* and FIG. 5*c* show embodiments of the look-ahead headroom calculation. By calculating the future signal curve (see FIG. 5*a*) with the estimation of the future signal curve based on the current signal block (see FIG. 5*b*) with direct estimation of the look-ahead headroom $h_a$ based on the current signal curve (see FIG. 5*c*).

Thus, FIG. 5*a* shows, e.g., a calculation of the second maximum deflection portion 180*b*, $h_a$ based on a prediction 135 of the current diaphragm deflection signal block $X_i$ based on the current loudspeaker signal $U_i$ and the subsequent diaphragm deflection signal block $X_{i+1}$ based on the subsequent loudspeaker signal $U_{i+1}$, wherein the prediction 135 takes place, e.g., by means of a non-linear deflection model. Thus, the apparatus 100 can determine exactly how much the current diaphragm deflection signal block $X_i$ should be attenuated so that a high mechanical protection of a transducer (e.g., diaphragm, suspension) of the loudspeaker 200 can be ensured by the apparatus.

FIG. 5*b* shows, e.g., a calculation of the second maximum deflection portion 180*b*, $h_a$, wherein the subsequent diaphragm deflection signal block $X_{i+1}$ is estimated 136 based on the current diaphragm deflection signal block $X_i$, whereby the second maximum deflection portion 180*b*, $h_a$ can be calculated faster and, hence, more efficiently. The second maximum deflection portion 180*b*, $h_a$ can be determined by means of the apparatus from the current diaphragm deflection signal block $X_i$ and the estimated subsequent diaphragm deflection signal block $X_{i+1}$. The estimation 136 of the subsequent diaphragm deflection signal block $X_{i+1}$ can take place, e.g., via a neural network.

FIG. 5*c* shows, e.g., a calculation of the second maximum deflection portion 180*b*, $h_a$, wherein the second maximum deflection portion 180*b*, $h_a$ is estimated 182 based on the current diaphragm deflection signal block $X_i$. Thus, the second maximum deflection portion 180*b*, $h_a$ can be calculated even faster and more efficiently, as the subsequent diaphragm deflection signal block $X_{i+1}$ is not needed for the calculation. The estimation 182 can take place, e.g., via a neural network.

The calculation of the look-ahead headroom $h_a$ is explicitly not based on the subsequent signal analysis steps, i.e. the same can take place separately with the respective input signals.

According to FIG. 4, a next step in the signal analysis 150 can include the identification of critical deflection values 152 in the predicted signals (e.g., the diaphragm deflection signal $X_i$ such as $X_i$ and $X_{i+1}$ or the frequency band signal blocks $X_{i,B0}$ to $X_{i,BN}$), which can later serve to calculate the attenuation factors for the individual frequency bands.

For searching the critical deflection values 152 (or further temporal positions), e.g., three different signal combinations (e.g., additive combinations) can be used:

1. $X_{alt} + X_i$,

2. $X_{alt} + X_{i,B0} \ldots X_{alt} + X_{i,BN}$,

3. $|X_{alt}| + |X_i|$, wherein $$X_{alt}[k] = \begin{cases} \tilde{X}_{i-1}[k + M_{step}], & k < M_{block} - M_{step} \\ 0, & k \geq M_{block} - M_{step} \end{cases},$$

In the three signal combinations, e.g., all extremes exceeding the deflection limit $X_{max}$ are identified as critical deflection values. In that way, e.g., L critical deflection values and their indices $k_{c,l}$ with $0 \leq l \leq L$ are found. The critical deflection values serve to prevent optimization of the attenuation factors with random start values, which accelerates the algorithm.

In the following, a look-back headroom 180a can understood to be understood to be a first maximum deflection portion. A processing loop having L iterations starts. Here, first the look-back headroom is calculated, e.g., for the l-th critical deflection value having the index $k_{c,l}$, i.e., how large the overall attenuation of the current block i should at least be so that the overlap with the preceding already processed block i−1 does not result in exceeding the limiting value $X_{max}$. The look-back headroom for the l-th critical deflection value $h_{b,l}$ is calculated, e.g., by:

$$h_{b,l} = \frac{\text{sign}(X_i[k_{c,l}])X_{max} - X_{alt}[k_{c,l}]}{X_{max}}$$

A final headroom $h_l$, 184 for the l-th critical deflection value is calculated, e.g., as $h_l = \text{sign}(X_i[k_{c,l}])\min(|h_{b,l}|,|h_a|)$.

Thus, according to an embodiment, the apparatus can be configured to calculate a level ($h_l X_{max}$) based on the first maximum deflection portion ($h_{b,l}$) when the first maximum deflection portion ($h_a$) is smaller than the second maximum deflection portion ($h_a$), or to calculate the level ($h_l X_{max}$) based on the second maximum deflection portion ($h_a$) when the second maximum deflection portion ($h_a$) is smaller than the first maximum deflection portion ($h_{b,l}$).

FIG. 4 shows, e.g., the signal analysis 150 of FIG. 3 in detail.

According to FIG. 3, for each of the N frequency bands, e.g., a linear attenuation factor $g_0$ to $g_N$ can be calculated by means of the attenuation factor determination 153a (here, linear means, e.g., that no additional nonlinearities are introduced in the respective signal block which would be the case in a compressor). Here, according to an embodiment, the deflection in every frequency band is weighted with a psychoacoustic model 190, whereby the sound quality and loudness are to stay as high as possible. The psychoacoustic model 190 consists of a simple variation, e.g., of the A evaluation according to DIN EN 61672-1 2003-10, but can also represent a nonlinear implementation of the curves having the same loudness or a more complex model (e.g., masking in the time and frequency domain). All listings of psychoacoustic models stated herein are to be considered as exemplary and not limiting.

In that way, e.g., all L critical deflection values are processed until, e.g., an optimum reduction of the maximum overall deflection is obtained. If the overall deflection cannot be lowered below the limiting value $h_l X_{max}$ based on the critical deflection values, possibly, LMS optimization with the best attenuation factors up to then can be used as start values to find adequate attenuation factors.

Figure 6:
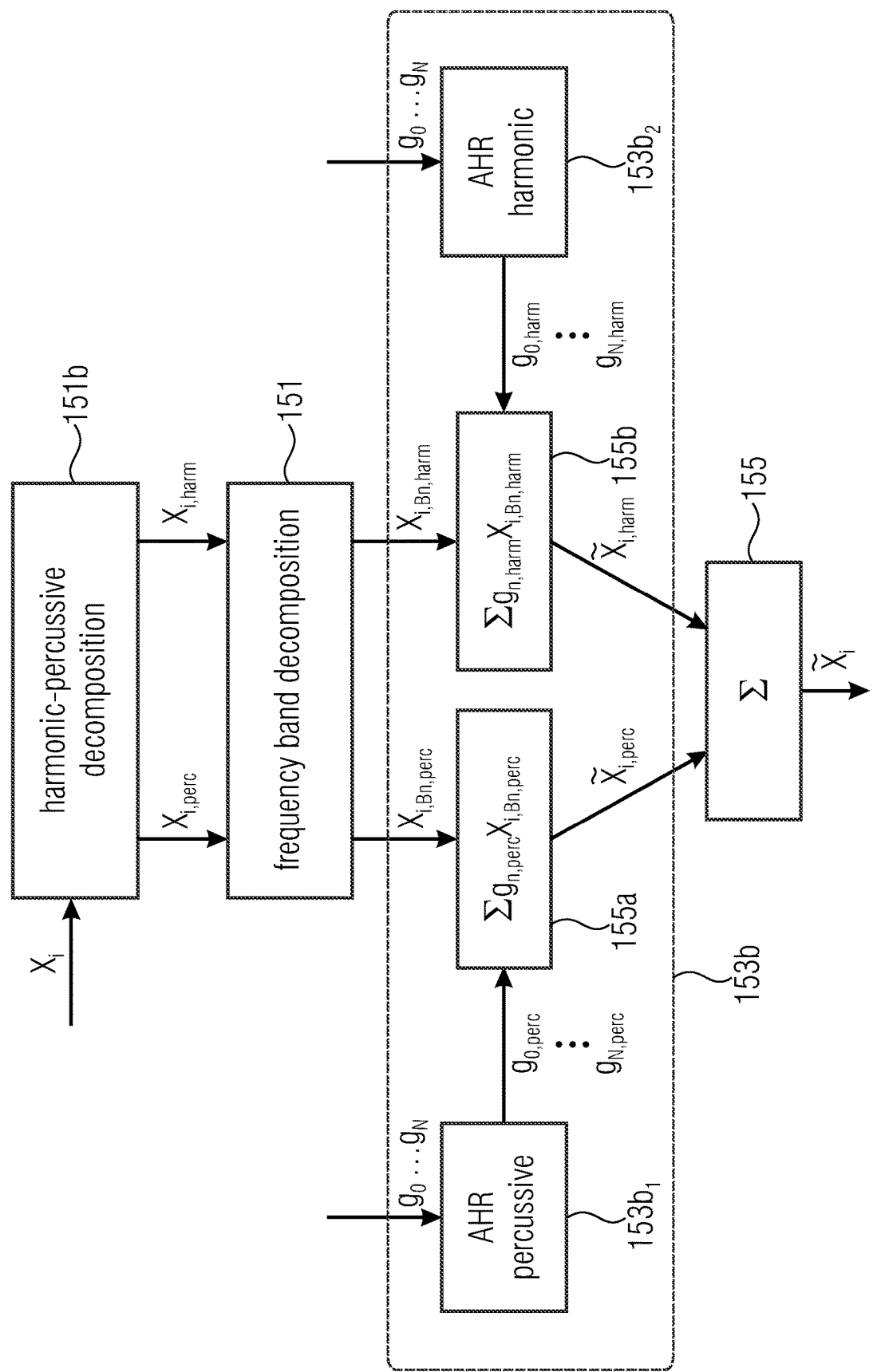
FIG. 6 a block diagram of an exemplary application of attenuation factors, here exemplarily as an application of frequency-dependent attenuation factors to the diaphragm deflection signal block.

If the attenuation factors for the current diaphragm deflection signal block $X_i$ are known, the same are regulated, e.g., via attack, hold and release functions (AHR) 153b, which can again be independent of one another within the individual frequency bands. Here, additionally, different AHR functions (e.g., a percussive AHR 153$b_1$ and a harmonic AHR 153$b_2$) can be applied to the percussive signal portion and the harmonic signal portion, which can improve the sound quality further (shorter time constants are, e.g., suitable for percussive signals, longer ones, e.g., for harmonic signals). For this, the signal $X_i$ should previously be divided into the respective portions by harmonic-percussive decomposition 151b and then be processed by the filterbank (frequency band decomposition 151). FIG. 6 represents this process schematically.

FIG. 6 shows different attack, hold and release functions 153$b_1$, 153$b_2$ for percussive and harmonic signal portions that can be a detail of the attack, hold and release functions 153b of FIG. 3. According to an embodiment, the attenuation factor determination 153 of FIG. 1 can have the same features and functionalities as the different attack, hold and release functions 153$b_1$, 153$b_2$.

The attenuation factors $g_0$ to $g_N$ can obtain and adapt both the percussive AHR 153$b_1$ as well as the harmonic AHR 153$b_2$ from the attenuation factor determination 153a (illustrated in FIG. 3).

The attack, hold and release functions (AHR) 153b can comprise both the percussive AHR 153$b_1$ as well as the harmonic AHR 153$b_2$, as well as a synthesis of a percussive 155a and a harmonic 155b modified diaphragm deflection signal of the current time block, but it is also possible that the attack, hold and release functions (AHR) 153b only comprise the percussive AHR 153$b_1$ and the harmonic AHR 153$b_2$ and the computing means 155 of FIG. 1 or FIG. 3 comprises the synthesis of a percussive 155a and harmonic 155b modified diaphragm deflection signal of the current time block, as well as summing up 155 the percussive 155a and harmonic 155b modified diaphragm deflection signal of the current time block of FIG. 6. In other words, in 155a and 155b, the frequency bands can already be summed up separately for a percussive 155a and harmonic 155b diaphragm deflection signal portion. Summing up 155 in FIG. 6 then sums up the two diaphragm deflection signal portions.

Signal Synthesis

The percussive 155a and the harmonic 155b modified diaphragm deflection signal of the current time block is then, e.g., summed up 155, and from the limited deflection $\tilde{X}_i$ (e.g., the modified current diaphragm deflection signal), the voltage that has to be supplied to the loudspeaker 200 to cause the desired deflection is calculated, e.g., with the help of an inverse nonlinear deflection model 175. This inverse model can also be configured as simple filter, physical structural model or machine-learning model. All listings for inverse models stated herein are to be considered as exemplary and not as limiting. The summing up 155, as well as the percussive 155a and harmonic 155b modified diaphragm deflection signals of the current time block of FIG. 6 may have features and functionalities of the computing means 155 of FIG. 1 and FIG. 3, and/or the computing means 155 of FIG. 1 and FIG. 3 may have features and functionalities of the summing up 155, as well as the percussive 155a and harmonic 155b modified diaphragm deflection signals of the current time block of FIG. 6.

The comparative example and its implementation include complex processes that are reduced in accordance with embodiments described below.

Figure 2A:
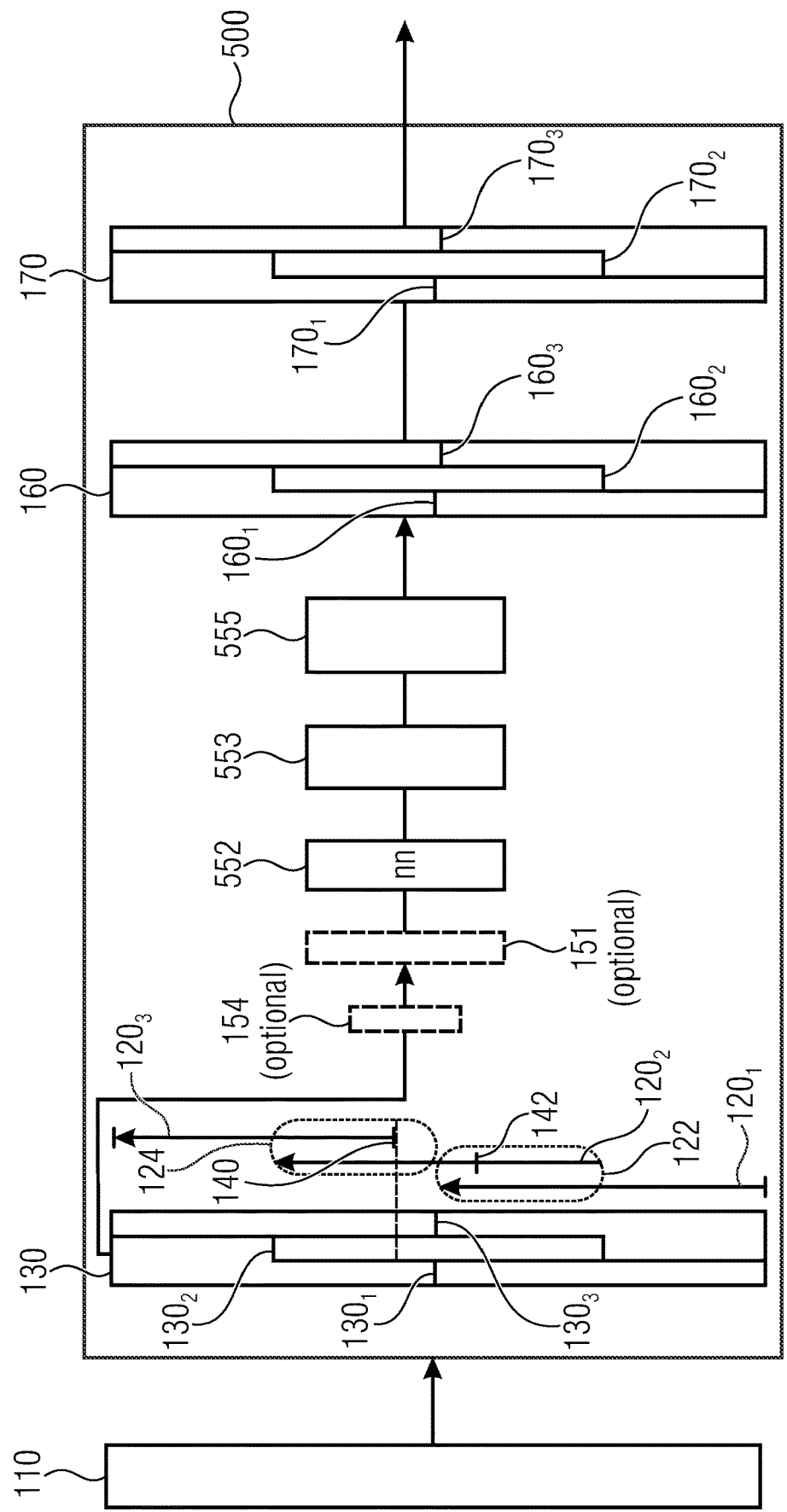
FIGS. 2a and 2b a schematic representation of an apparatus in accordance with an embodiment having ML-based evaluation timing and a block diagram of an overall signal flow in accordance with an implementation of this apparatus.
Figure 2B:
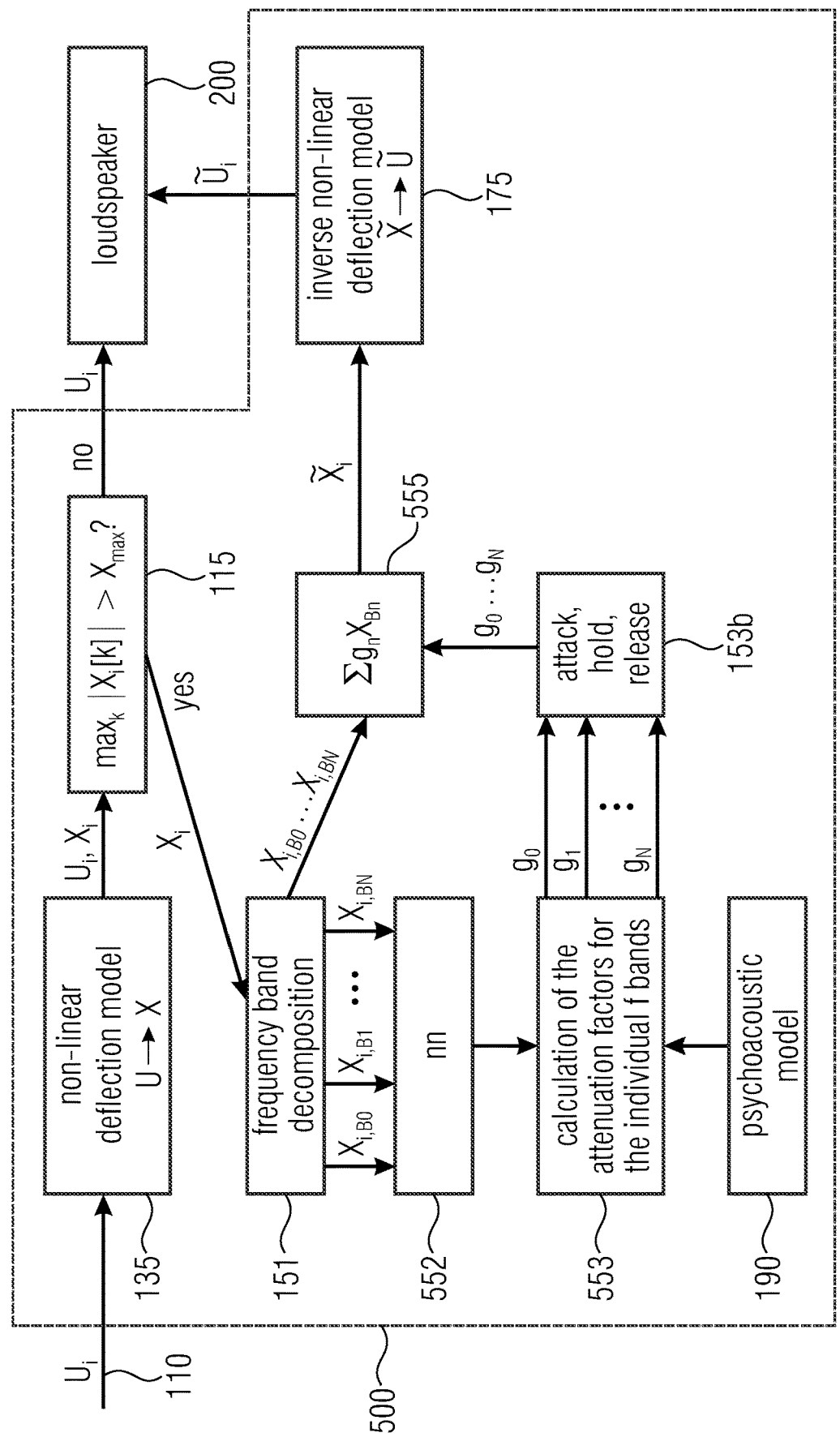

FIGS. 2a and 2b show an alternative apparatus 500 with regard to FIGS. 1 and 3, in which, unlike FIGS. 1 and 3, the determinations of the temporal evaluation position 140— when no frequency band decomposition is performed—and/ or the determination of the temporal evaluation positions 142—when a frequency band decomposition is performed— are performed in that the current diaphragm deflection signal block $X_i[k_0]$, or 130$_2$, or its frequency band signal time blocks $X_{i,B\#}$ in the block 552 is/are subjected to an inference by an evaluation temporal position inference machine learning model, such as, for example, a neural network (nn), the model having been trained accordingly in such a way that subsequently, the attenuation determined there will be optimal, e.g. optimal in the sense of as good and as loud a reproduction as possible, in terms of human hearing, of the audio signal that corresponds to the synthesized loudspeaker signal, while preventing diaphragm over-deflection. Attenuation factor determination 553 then uses the determined evaluation times as described above to determine an attenuation factor, which is then applied to the current diaphragm deflection signal block via module 555 to obtain the corresponding modified current diaphragm deflection signal block $\tilde{X}_i$, or 160$_2$. In the case of frequency band-wise processing by the optional block 151, the attenuation factor calculation and attenuation factor application blocks 553 and 555 also operate frequency band-wise. Diaphragm deflection signal splitting 154 may also optionally be used. It is readily apparent that the signal processing has been significantly simplified with respect to FIGS. 1 and 3. The attenuation factor application module 555 may be configured as shown in FIG. 6. As an alternative to supplying the diaphragm deflection signal block $X_0[k_0]$ or 130$_2$ or its frequency band signal time blocks $X_{i,B\#}$ to the ML module, the latter model may also be configured to operate directly on the basis of the loudspeaker signal 110 or $U_i$.

Figure 2C:
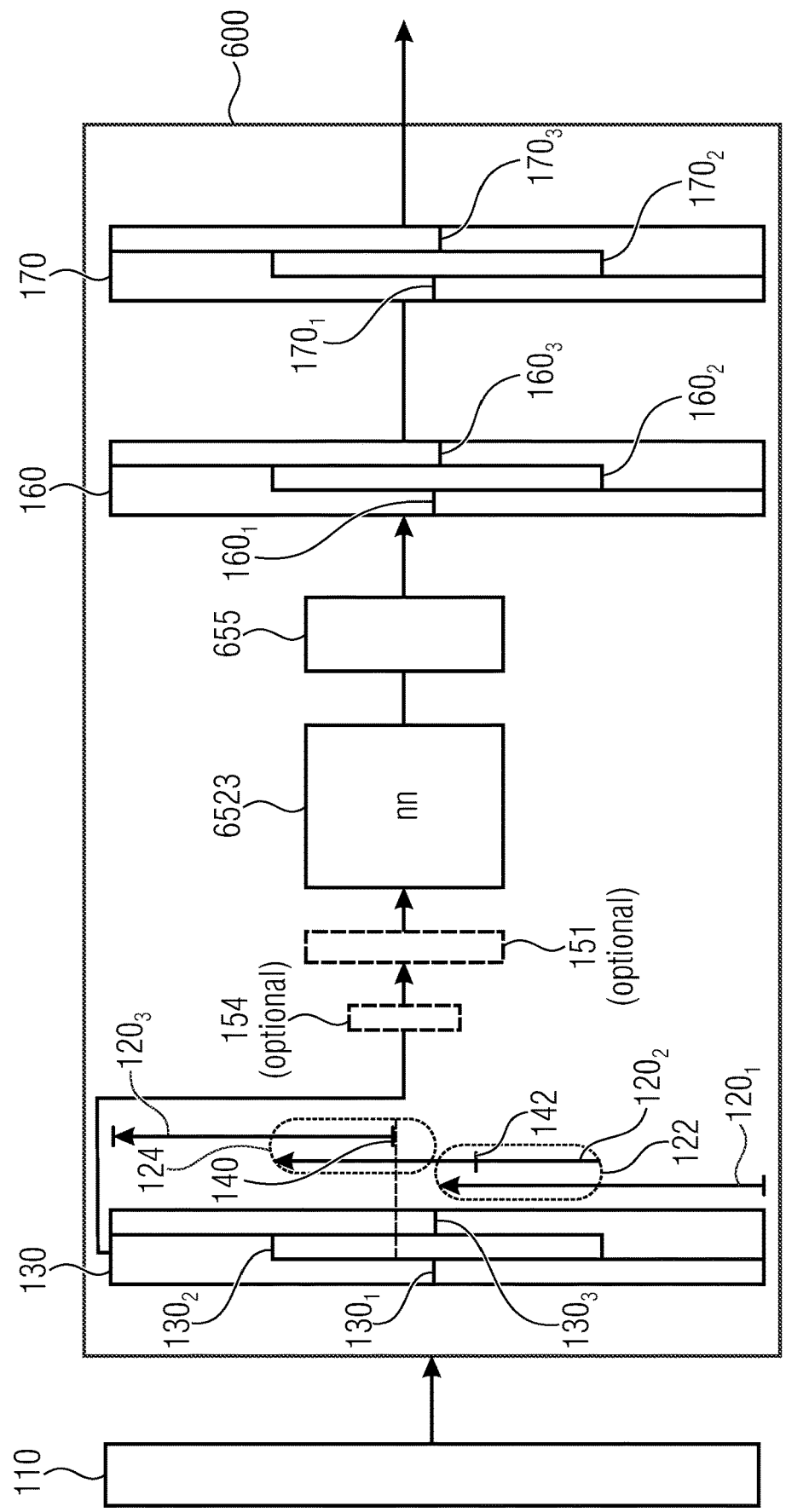
FIGS. 2c and 2d a schematic representation of an apparatus in accordance with an embodiment having direct ML-based attenuation factor determination and a block diagram of an overall signal flow in accordance with an implementation of this apparatus.
Figure 2D:
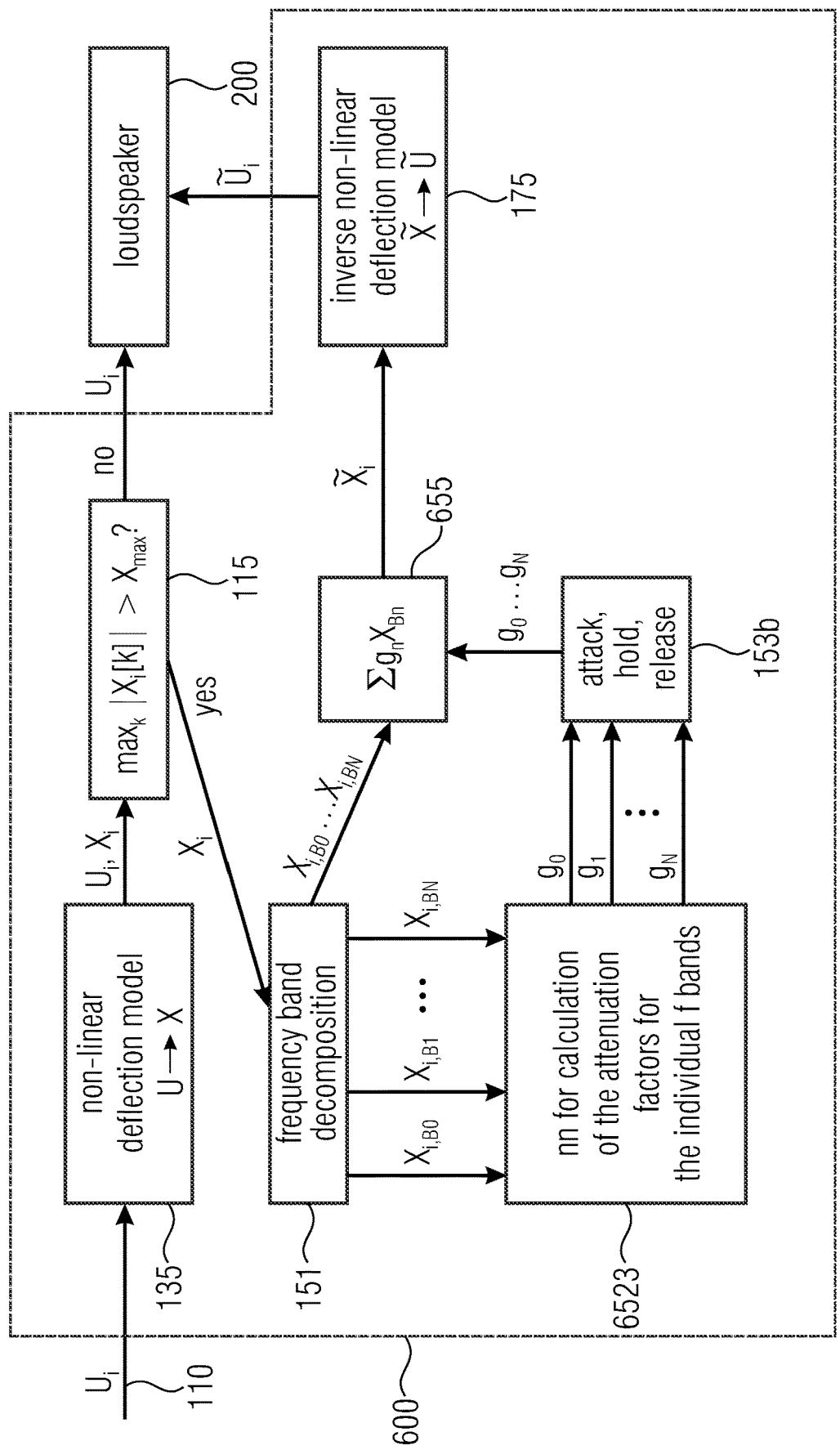

FIGS. 2c and 2d show an alternative apparatus 600 as compared to FIGS. 1 and 3, in which, unlike FIGS. 1 and 3, there is no determination of the temporal evaluation position 140 and no determination of temporal evaluation positions 142, but in that the current diaphragm deflection signal block $X_i[k_0]$, or 130$_2$, or its frequency band signal time blocks $X_{i,B\#}$ in the block 6523 is/are subjected to an inference by an evaluation temporal position inference machine learning model, such as a neural network (nn), an attenuation factor is determined—in a frequency-global or frequency band-specific manner, the model having been trained accordingly such that the attenuation determined in this way will be optimal, e.g. optimal in the sense of as good and as loud a reproduction as possible, in terms of human hearing, of the audio signal that corresponds to the synthesized loudspeaker signal, while preventing diaphragm over-deflection. The hearing threshold is used, for example, to calculate the attenuation factors, i.e. the ground truth for the ML. The hearing threshold would then only be used to train the ML model and does not occur in FIG. 2d. The attenuation factor is then applied to the current diaphragm deflection signal block via module 655 to obtain the corresponding modified current diaphragm deflection signal block $\tilde{X}_i$, or 160$_2$. In the case of frequency band-wise processing by the optional block 151, the attenuation factor application block 655 also operates in an frequency band-wise manner. The diaphragm deflection signal splitting 154 may also optionally be used. It can readily be seen that the signal processing has been significantly simplified as compared to FIGS. 1 and 3. As an alternative to supplying the diaphragm deflection signal block $X_i[k_0]$, or 130$_2$, its frequency band signal time blocks $X_{i,B\#}$ to the ML module, the latter model may also be configured to operate directly on the basis of the loudspeaker signal 110, or $U_i$.

Thus, the embodiments allow to prevent diaphragm over-deflection of a loudspeaker. As described for the comparison example, the basic concept is on the basis of implementing a comparison-based attenuation of overlapping diaphragm deflection signal blocks that takes into account an overlap-add. For this purpose, for example, a level is determined up to which the diaphragm deflection signal block may be modulated in order to attenuate the current diaphragm deflection signal block in comparison to the subsequent diaphragm deflection signal block in an optimized ratio. This may allow the loudspeaker to be operated at high performance, e.g., while utilizing the full possible deflection of the diaphragm without the risk of diaphragm over-deflection. However, an optimal deflection yield may not always be guaranteed so far.

To reduce the group delay of the system, it is possible to approximate the future diaphragm deflection signal block while using the expiring window function of the overlap-add method to shorten the length of a signal block (look-ahead headroom prediction). However, this may result in a less than optimal deflection yield.

An improved deflection yield may be achieved by calculating the available headroom or the respective attenuation factors via a loop over all available samples of the current diaphragm deflection signal block. By constantly comparing this with the "best" value found, an optimal (best case) deflection yield might be guaranteed. However, this involves a very high computational effort.

In accordance with the embodiments above, the computational effort is kept lower during operation by training a machine learning model in an offline manner. The embodiments fell into one of the following two basic variants:
1. In the first variant, the optimal attenuation values are predicted from the input signal.
2. In the second variant, the samples or evaluation times are determined, on the basis of which the optimal attenuation values can be calculated.

Here, the attenuation values may be calculated for different frequency bands according to a perception-based model. This provides an efficient way to protect a loudspeaker from overload without disturbing the perceived auditory impression.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described in connection with or as a method step also represent a description of a corresponding block or detail or feature of a corresponding device. Some or all of the method steps may be performed by a hardware device (or while using a hardware device) such as a microprocessor, a programmable computer or an electronic circuit, for example. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded. The data carrier, the digital storage medium or the computer-readable medium are typically concrete and/or non-transitory and/or non-transient.

A further embodiment of the inventive method thus is a data stream or a sequence of signals representing the computer program for performing any of the methods described herein. The data stream or the sequence of signals may be configured, for example, to be transferred via a data communication link, for example via the internet.

A further embodiment includes a processing means, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU) or a graphics card (GPU), or may be a hardware specific to the method, such as an ASIC.

The devices described herein may be implemented, e.g., while using a hardware apparatus or while using a computer or while using a combination of a hardware apparatus and a computer.

The devices described herein or any components of the devices described herein may be implemented, at least partly, in hardware or in software (computer program).

The methods described herein may be implemented, e.g., while using a hardware apparatus or while using a computer or while using a combination of a hardware apparatus and a computer.

The methods described herein or any components of the devices described herein may be executed, at least partly, by hardware or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Apparatus for modifying a loudspeaker signal for preventing diaphragm over-deflection, configured to
predict a diaphragm deflection signal, block-by-block, in overlapping time blocks, on the basis of the loudspeaker signal to acquire one diaphragm deflection signal block per time block;
determine, for the current time block, by subjecting a current diaphragm deflection signal block or the loudspeaker signal in the current time block to an inference by an attenuation inference machine learning model, an attenuation factor for preventing diaphragm over-deflection while taking into account mutual diaphragm deflection signal block overlap;
attenuate the current diaphragm deflection signal block with the attenuation factor to acquire a modified current diaphragm deflection signal block; and
synthesize a modified loudspeaker signal on the basis of the modified current diaphragm deflection signal block.

2. Apparatus as claimed in claim 1, the apparatus being configured to process the diaphragm deflection signal blocks in a manner in which they are decomposed into frequency band signal time blocks.

3. Apparatus as claimed in claim 2, the apparatus being configured to calculate, for each frequency band signal time block, a frequency band-specific attenuation factor by subjecting the respective frequency band signal time block to the inference by the attenuation inference machine learning model, and to attenuate the respective frequency band signal time block with same.

4. Apparatus as claimed in claim 3, the apparatus being configured to compare, for each frequency band signal time block, the frequency band-specific attenuation factor with a version of the attenuation factor for a previous time block, reduced in attenuation strength by a predetermined fading-away function, and to use, for the current time block among same, a selected attenuation factor associated with a higher attenuation.

5. Apparatus as claimed in claim 4, the apparatus being configured to divide the current diaphragm deflection signal block into a percussive signal portion and a harmonic signal portion and to determine the predetermined fading-away function in dependence on the percussive signal portion and/or the harmonic signal portion.

6. Apparatus for modifying a loudspeaker signal to prevent diaphragm over-deflection, configured to predict, block by block, in overlapping time blocks, a diaphragm deflection signal on the basis of the loudspeaker signal to acquire one diaphragm deflection signal block per time block;
determine a temporal position within an overlap area of a current time block with a subsequent time block by subjecting a current diaphragm deflection signal block or the loudspeaker signal in the current time block to an inference by an evaluation temporal position inference machine learning model;
calculate, for the current time block, an attenuation factor for the current diaphragm deflection signal block while taking into account a comparison of the current diaphragm deflection signal block with a subsequent diaphragm deflection signal block or an estimate of the subsequent diaphragm deflection signal block from the current diaphragm deflection signal block at the temporal position;

attenuate the current diaphragm deflection signal block with the attenuation factor to acquire a modified current diaphragm deflection signal block; and synthesize a modified loudspeaker signal on the basis of the modified current diaphragm deflection signal block.

7. Apparatus as claimed in claim 6, wherein the apparatus is configured to determine a level up to which the current diaphragm deflection signal block may be modulated, the apparatus being configured, for calculating the level, to determine a quotient between the current diaphragm deflection signal block at the temporal position, on the one hand, and a sum of the subsequent diaphragm deflection signal block or of the estimation of the subsequent diaphragm deflection signal block at the temporal position and the current diaphragm deflection signal block at the temporal position, on the other hand.

8. Apparatus as claimed in claim 7, the apparatus being configured to scale the quotient with a safety factor.

9. Apparatus as claimed in claim 6, the apparatus being configured to process the diaphragm deflection signal blocks in a manner in which they are decomposed into frequency band signal time blocks.

10. Apparatus as claimed in claim 9, the apparatus being configured to determine, for each frequency band signal time block, a frequency band-specific temporal position by subjecting the respective frequency band signal time block to the inference by the evaluation temporal position inference machine learning model, to calculate thereat, while taking into account a comparison of the respective frequency band signal time block with a corresponding frequency band signal time block of the subsequent diaphragm deflection signal block or an estimation of the subsequent diaphragm deflection signal block, a frequency band-specific attenuation factor from the current diaphragm deflection signal block, and to attenuate the respective frequency band signal time block with the former.

11. Apparatus as claimed in claim 10, the apparatus being configured to compare, for each frequency band signal time block, the frequency band-specific attenuation factor with a version of the attenuation factor for a previous time block, reduced in attenuation strength by a predetermined fading-away function, and to use, for the current time block among same, a selected attenuation factor associated with a higher attenuation.

12. Apparatus as claimed in claim 11, the apparatus being configured to split the current diaphragm deflection signal block into a percussive signal portion and a harmonic signal portion and to determine the predetermined fading-away function in dependence on the percussive signal portion and/or the harmonic signal portion.

13. Apparatus for modifying a loudspeaker signal for preventing diaphragm over-deflection, configured to
predict a diaphragm deflection signal, block-by-block, in overlapping time blocks, on the basis of the loudspeaker signal to acquire one diaphragm deflection signal block per time block;
determine, for the current time block, by subjecting a current diaphragm deflection signal block or the loudspeaker signal in the current time block to an inference by an attenuation inference machine learning model, an attenuation factor for preventing diaphragm over-deflection while taking into account mutual diaphragm deflection signal block overlap;
attenuate the current diaphragm deflection signal block with the attenuation factor to acquire a modified current diaphragm deflection signal block; and
synthesize a modified loudspeaker signal on the basis of the modified current diaphragm deflection signal block,
or apparatus as claimed in claim 6,
the apparatus being configured to calculate a modified current loudspeaker signal block from the modified current diaphragm deflection signal block and to subject a first part of the modified current loudspeaker signal block to an overlap-add with a modified preceding loudspeaker signal block to synthesize a modified loudspeaker signal.

14. Apparatus as claimed in claim 13, the apparatus being configured to provide a current loudspeaker signal instead of the modified current loudspeaker signal block when a maximum deflection of the current diaphragm deflection signal block of the current time block does not exceed a maximum deflection limiting value.

15. Method of modifying a loudspeaker signal to prevent diaphragm over-deflection, comprising
predicting, block by block, in overlapping time blocks, on the basis of the loudspeaker signal, a diaphragm deflection signal in order to acquire, per time block, a diaphragm deflection signal block;
determining, for the current time block, an attenuation factor for preventing diaphragm over-deflection while taking into account mutual diaphragm deflection signal block overlap by subjecting a current diaphragm deflection signal block or the loudspeaker signal in the current time block to an inference by an attenuation inference machine learning model;
attenuating the current diaphragm deflection signal block with the attenuation factor to acquire a modified current diaphragm deflection signal block; and
synthesizing a modified loudspeaker signal on the basis of the modified current diaphragm deflection signal block.

16. Method of modifying a loudspeaker signal to prevent diaphragm over-deflection, comprising
predicting, block by block, in overlapping time blocks, on the basis of the loudspeaker signal, a diaphragm deflection signal to acquire one diaphragm deflection signal block per time block;
determining a temporal position within an overlap area of a current time block with a subsequent time block by subjecting a current diaphragm deflection signal block or the loudspeaker signal in the current time block to an inference by an evaluation temporal position inference machine learning model;
for the current time block, calculating an attenuation factor for the current diaphragm deflection signal block while taking into account a comparison of the current diaphragm deflection signal block with a subsequent diaphragm deflection signal block or an estimation of the subsequent diaphragm deflection signal block from the current diaphragm deflection signal block at the temporal position;
attenuating the current diaphragm deflection signal block with the attenuation factor to acquire a modified current diaphragm deflection signal block; and
synthesizing a modified loudspeaker signal on the basis of the modified current diaphragm deflection signal block.

17. A non-transitory digital storage medium having a computer program stored thereon to perform the method of modifying a loudspeaker signal to prevent diaphragm over-deflection, said method comprising:

predicting, block by block, in overlapping time blocks, on the basis of the loudspeaker signal, a diaphragm deflection signal in order to acquire, per time block, a diaphragm deflection signal block;

determining, for the current time block, an attenuation factor for preventing diaphragm over-deflection while taking into account mutual diaphragm deflection signal block overlap by subjecting a current diaphragm deflection signal block or the loudspeaker signal in the current time block to an inference by an attenuation inference machine learning model;

attenuating the current diaphragm deflection signal block with the attenuation factor to acquire a modified current diaphragm deflection signal block; and synthesizing a modified loudspeaker signal on the basis of the modified current diaphragm deflection signal block, when said computer program is run by a computer.

18. A non-transitory digital storage medium having a computer program stored thereon to perform the method of modifying a loudspeaker signal to prevent diaphragm over-deflection, said method comprising:

predicting, block by block, in overlapping time blocks, on the basis of the loudspeaker signal, a diaphragm deflection signal to acquire one diaphragm deflection signal block per time block;

determining a temporal position within an overlap area of a current time block with a subsequent time block by subjecting a current diaphragm deflection signal block or the loudspeaker signal in the current time block to an inference by an evaluation temporal position inference machine learning model;

for the current time block, calculating an attenuation factor for the current diaphragm deflection signal block while taking into account a comparison of the current diaphragm deflection signal block with a subsequent diaphragm deflection signal block or an estimation of the subsequent diaphragm deflection signal block from the current diaphragm deflection signal block at the temporal position;

attenuating the current diaphragm deflection signal block with the attenuation factor to acquire a modified current diaphragm deflection signal block; and synthesizing a modified loudspeaker signal on the basis of the modified current diaphragm deflection signal block, when said computer program is run by a computer.

* * * * *